United States Patent [19]

Simeone, Sr. et al.

[11] Patent Number: 4,764,240

[45] Date of Patent: Aug. 16, 1988

[54] APPARATUS AND METHOD FOR AUTOMATICALLY FORMING UNITARY BONDED BOARD STRUTURES

[76] Inventors: Joseph M. Simeone, Sr., 24542 Quintana Dr., Mission Viejo, Calif. 92691; Joseph M. Simeone, Jr., 466 N. Earlham St., Orange, Calif. 92669

[21] Appl. No.: 48,674

[22] Filed: May 11, 1987

Related U.S. Application Data

[63] Continuation-in-part of Ser. No. 887,742, Jul. 18, 1986, abandoned.

[51] Int. Cl.[4] .......... B32B 31/00

[52] U.S. Cl. .......... 156/303; 156/216; 156/226; 156/350; 156/353; 156/479; 156/486; 156/522; 156/552; 493/947

[58] Field of Search .......... 156/265, 259, 271, 477.1, 156/479, 482, 486, 552, 522, 297, 301, 302, 303, 464, 353, 354, 355, 216, 380, 200, 226; 493/947, 241, 399, 248; 281/29, 49

[56] References Cited

U.S. PATENT DOCUMENTS

| | | | |
|---|---|---|---|
| 846,123 | 3/1907 | Mehle | 493/438 |
| 1,574,789 | 3/1926 | Burgess | 493/947 |
| 1,769,391 | 7/1930 | Reutener . | |
| 1,971,892 | 8/1934 | Anderson et al. | 493/947 |
| 2,088,805 | 8/1937 | Olm et al. | 493/947 |
| 2,346,874 | 4/1944 | Russell | 154/42 |
| 2,645,795 | 7/1953 | Pitner | 156/477.1 X |
| 2,649,674 | 8/1953 | Bartelt | 493/248 |
| 2,977,271 | 3/1961 | Lutwack | 156/552 X |
| 2,991,214 | 7/1961 | Burkholder | 156/552 X |
| 3,029,073 | 4/1962 | Wright | 493/399 |
| 3,092,532 | 6/1963 | Swick | 156/157 |
| 3,127,165 | 3/1964 | Denny et al. | 493/399 |
| 3,273,913 | 9/1966 | Mullen | 156/479 X |
| 3,284,982 | 11/1966 | Conti | 53/137 |
| 3,416,285 | 12/1968 | Standley et al. | 53/3 |
| 3,604,182 | 9/1971 | Jepson | 53/124 C |
| 3,622,425 | 11/1971 | Savarick | 156/505 |
| 4,004,962 | 1/1977 | Kleid | 156/479 X |
| 4,008,650 | 2/1977 | Alter et al. | 493/241 |
| 4,147,380 | 4/1979 | Nelson | 156/259 X |
| 4,441,950 | 4/1984 | Lolli | 156/216 |
| 4,559,030 | 12/1985 | Tada | 493/252 |
| 4,586,917 | 5/1986 | Robinson | 493/947 X |

*Primary Examiner*—Donald E. Czaja
*Assistant Examiner*—Jeff H. Aftergut
*Attorney, Agent, or Firm*—F. Eugene Logan

[57] ABSTRACT

This invention is for an apparatus and method for automatically forming unitary bonded board structures from a source of boards and a single continuous piece of tape. In one embodiment of this invention board pair are automatically fed into the machine. In another embodiment a gusset is automatically formed in the unitary bonded board structure without scoring the tape. The method and machine operate automatically on the boards and tape for the most part in an in-line arrangement travelling along a horizontal plane in one direction that is about thirty inches off the floor so that the entire operation can be observed and controlled by a single operator.

26 Claims, 28 Drawing Sheets

SECTION A-A

APPARATUS AND METHOD FOR AUTOMATICALLY FORMING UNITARY BONDED BOARD STRUTURES

CROSS REFERENCES TO RELATED APPLICATIONS

This is a continuation-in-part application to application Ser. No. 887,742, filed on July 18, 1986, entitled Apparatus and Method for Automatically Forming Unitary Bonded Board Structures, now abandoned, which is hereby incorporated herein by reference.

BACKGROUND OF INVENTION

In the production of unitary bonded board structures such as file folders, game boards and the like, such structures have generally been produced by separate process steps which are not joined together in a single continuous process commencing with board pairs and a single continuous piece of tape. Generally, board pairs are joined or taped together by hand. An automatic process for automatically forming a gusset from previously hand bonded structures has been disclosed; however, the gusset is formed by scoring the tape prior to creasing the tape. Scoring the tape is not desirable because it weakens the tape at the score line which often shortens the useful life of the bonded structure.

What is needed is an automatic apparatus and method for making unitary bonded board structures from boards and a continuous filament of tape with accurate machine positioning, bonding and cutting of the tape followed by, and without intermediate operator handling, automatic gusset forming and boning so that such structures are stronger and have an improved appearance and the efficiency of manufacture substantially improved.

SUMMARY OF THE INVENTION

The present invention is for an apparatus and method for automatically and continuously producing in a single machine unitary bonded board structures. The present invention allows unitary bonded board structures to be produced automatically from boards and a continuous filament of tape with accurate machine positioning, bonding and cutting of tape followed by, and without intermediate operator handling, automatic gusset forming and boning. Structures produced by the principles of this invention are stronger and have an improved appearance. The efficiency of manufacturing structures using the principles of this invention is improved. The machine can be coupled with an automatic board placing mechanism so that pairs of boards can be automatically and continuously but on an intermittent basis fed to the apparatus of the invention together with a single continuous piece of tape from a tape source and unitary bonded board structures automatically and continuously produced. This invention further comprises, if desired, automatically forming a gusset in the unitary bonded board structures without the need to score the tape or other material which bonds the board pairs together thereby producing a more durable gusset than if the gusset were formed with scoring and creasing along the score lines. In one embodiment of this invention expandable file folders can be produced automatically from a source of folder boards or panels and a continuous roll of tape without the need to inventory bonded structures first and then from a source of bonded structures feeding such to a gusset forming machine. In this invention an apparatus and method is provided for automatically and continuously producing unitary bonded board structures containing gussets from a source of boards and a single continuous roll of tape without scoring. The process is not interrupted, that is boards and tape can be automatically fed at one end and completely formed unitary bonded board structures produced and discharged from the other end of the machine without intermediate operator handling of the boards and tape intermediate of the final product.

Further of particular advantage to the operator is that the apparatus and method of this invention allows inadvertent jams to be quickly and easily cleared from the machine. The unitary bonded board structures produced by this invention wrap the tape over both ends of the boards and one end of the tape overlaps the other end so that only one cut end of the tape is exposed. Of further advantage to the operator is that this invention produces the unitary bonded board structures along a horizontal work plane that is at dining room-table-level elevation so that the operator can quite easily observe the entire operation thereby facilitating prompt corrective action should a problem develop in the line. The controls to the system are such that a single operator can control and monitor one or more machines. This invention achieves in one relative compact machine what heretofore required in the art several machines with operator handling of product in the various intermediate stages of completion between such several machines such as hand wrapping of at least part of the tape over the boards.

This invention can automatically produce file folders from boards or panels with or without expandable gussets, game boards, any other structures having two boards joined together by a flexible substance or tape. In one embodiment the entire length of the machine is about 12 feet.

Accordingly, there is provided by this invention an apparatus for automatically forming unitary bonded board structures from pairs of boards and a tape source comprising conveying means for automatically advancing board pairs placed thereon approximately along a first plane in a straight line first direction such that, when said machine is in use, at least one set of corresponding traverse edges of a board pair while being automatically advanced by said conveying means, lie approximately along a traverse edge straight line perpendicular to said first direction, and the first board of such board pair is automatically spaced apart from the second board of such board pair in a direction perpendicular to said first direction a predetermined traverse separation distance thereby forming and maintaining a traverse gap between such first and second boards as such boards are automatically advanced approximately along said first plane in said first direction by said conveying means; tape feeding means for automatically feeding, when said machine is in use, a tape from a tape source, proximate the under surface of such board pair and proximate said traverse gap such that the vertical projection of such thusly fed tape spans such traverse gap and overlies tha first board of such board pair a first predetermined traverse overlap distance traversely spaced from the longitudinal edge of the first board which forms such traverse gap and overlies the second board of such board pair a second predetermined traverse overlap distance traversely spaced from the longitudinal edge of the second board which forms such traverse gap; first bonding means for automatically bonding, when said machine is in use, such tape to the under surface of the first and second boards of such board pair over said first and second predetermined traverse overlap distances respectively as such board pair is automatically advanced by said conveying means approximately along said first plane in said first direction; tape cutting means for automatically cutting, when said machine is in use, such tape at a predetermined lead distance from the leading edge of such board pair as such board pair is automatically advanced by said conveying means approximately along said first plane in said first direction thereby forming a tape leader for such board pair immediately upstream of said tape cutting means, and also simultaneously forming a tape trailer for the preceding board pair immediately downstream of said tape cutting means; second bonding means for automatically bonding, when said machine is in use, such tape leader to the upper surface of the first and second boards of such board pair to which such tape leader is attached, over said first and second predetermined traverse overlay distances respectively thereby covering a portion of the leading edge of such board pair, and also for automatically bonding such tape leader to a portion of such tape which spans such traverse gap from the under surface of such board pair, as the leading edge of such board pair is automatically advanced by said conveying means approximately along said first plane in said first direction away from said cutting means; and third bonding means for automatically bonding, when said machine is is use, such tape trailer to the upper surface of the first and second boards of such board pair to which such tape trailer is attached approximately over said first and second predetermined traverse overlay distances respectively thereby covering a portion of the trailing edge of such boards, and for automatically bonding such tape trailer to a portion of such tape which spans such traverse gap from the under surface of such board pair longitudinally from the trailing edge thereof, thereby forming an unitary bonded board structure as such board pair is approximately in said first plane of said conveying means. In a further embodiment of this invention the apparatus further comprises controlling means for automatically controlling the speed of said conveying means, the speed of said tape feeding means, the speed of bonding effected by said first bonding means, the cycle of said tape cutting means, the cycle of said second bonding means, and the cycle of said third bonding means.

In another embodiment of this invention the apparatus further comprises tape wrapping means for automatically pulling, when said machine is in use, such tape trailer under tension over the trailing edge of such board pair to which such tape trailer is attached and over the upper surface of the first and second boards of such board pairs approximately over said first and second predetermined traverse overlay distances respectively. In a further embodiment the apparatus further comprises controlling means for automatically controlling said tape wrapping means. In yet another embodiment of this invention the apparatus further comprises holding means for automatically holding, when said machine is in use, such tape leader under tension for a predetermined length of time while such board pair to which such tape leader is attached is automatically advanced by said conveying means approximately along said first plane in said first direction away from said cutting means, said holding means also for automatically pulling such tape under tension over the leading edge of such board pair while such board pair is automatically advanced approximately along said first plane in said first direction away from said cutting means. In a further embodiment the apparatus further comprises controlling means for automatically controlling the cycle of said holding means.

In another embodiment of this invention the apparatus further comprises board feeding or placement means for automatically and sequentially placing, at predetermined time intervals or cycle, pairs of boards of approximately equal length along edges thereof to be joined by tape, from a source of such boards, in a predetermined orientation on said conveying means. In a further embodiment the apparatus further comprises controlling means for automatically controlling the cycle of the board feeding means so that said board feeding means is coordinated in time with said conveying means.

In yet another embodiment the apparatus further comprises blocking means for automatically blocking, when said machine is in use, such unitary bonded board structure over a blocking mandrel by automatically elevating and rotating about 180 degrees the second board relative to the first board of such unitary bonded board structure such that the vertical projection of such second board overlies the first board of such unitary bonded board structure, and such that the portion of tape between the first and second boards of such unitary bonded board structure lies approximately in a vertical plane perpendicular to said first plane, as such first board is automatically advanced approximately along said first plane in said first direction by said conveying means; and creasing means for automatically forming, when said machine is in use, at lease one crease in the portion of tape between the boards of such unitary bonded board structure as the first board thereof is automatically advanced approximately along said first plane in said first direction, said creasing means being downstream of said blocking means, thereby forming a gusset in such unitary bonded board structure. In a further embodiment the apparatus further comprises controlling means for automatically controlling the speed at which unitary bonded board structures are blocked by said blocking means and creased by said creasing means. In another further embodiment the apparatus further comprises pressing means for automatically pressing the gusset formed by said blocking means and said creasing means; and in a still further embodiment controlling means for automatically controlling the speed at which unitary bonded board structures from said creasing means are pressed by said pressing means.

There is also provided by this invention an apparatus for automatically forming a gusset in unitary bonded board structures which comprise a first and second board bounded together traversely by a tape overlay such that the first board is separated from the second board by a traverse gap which is spanned by such tape comprising conveying means for automatically advancing, when said machine is in use, an unitary bonded board structure approximately along a first plane in a straight line first direction; blocking means comprising a blocking mandrel for automatically blocking, when said machine is in use, such unitary bonded board structure over said blocking mandrel, said blocking mandrel having approximately parallel upper and lower surfaces and a vertical face, by automatically elevating and rotating about 180 degrees the second board relative to the first board of such unitary bonded board structure such that the vertical projection of such second board overlies the first board of such unitary bonded board structure, and such that the portion of tape between the first and second boards of such unitary bonded board structure lies approximately in a vertical plane perpendicular to said first plane, and abuts said vertical face of said blocking mandrel while said second board abuts the upper surface of said blocking mandrel and said first board abuts the lower surface of said blocking mandrel, as such first board is automatically advanced approximately along said first plane in said first direction by said conveying means; and creasing means for automatically forming, when said machine is in use, at least one crease in the portion of tape between the boards of such unitary bonded board structure as the first board thereof is automatically advanced approximately along said first plane in said first direction, said creasing means being downstream of said blocking means, thereby forming a gusset in such unitary bonded board structure. The gusset can be one fold or a plurality of folds. In a further embodiment the apparatus also comprises a controlling means for automatically controlling the speed at which unitary bonded board structures are blocked and creased. A further embodiment comprises pressing means for automatically pressing the gusset formed by said blocking and creasing means; and in a still further embodiment controlling means for controlling the speed of such pressing.

In one embodiment the tape wrapping means comprises clamping means for automatically clamping said board pair to the upper surface of a horizontal wrapping table, said upper surface lying approximately in said first plane; guiding means, which travels around said horizontal wrapping table, for automatically guiding and pulling said tape trailer over the trailing edge of such board pair and over said traverse gap while said board pair is clamped to said upper surface of said horizontal wrapping table by said clamping means; and wiping means, which also travels around said horizontal wrapping table, for automatically wiping said tape trailer, after it has been guided and pulled over the upper surface of such board pair by said guiding means, down onto the upper surface of said board pair and over said traverse gap.

In another embodiment there is provided a speed assist mechanism which increases the speed of the upper board panel after it is folded over the lower board panel corresponding thereto. The speed assist mechanism is operable for correcting any lagging of the upper, folded-over board panel relative to its corresponding lower board panel which is being driven by the line approximately along said first plane in said first direction. In one embodiment the speed assist mechanism is manually adjusted to a set point which is operable for increasing the speed of the upper, folded-over board panel so that it is in registry with its lower corresponding board panel at the point at which such board pair enters the pressing section of the machine. The speed assist mechanism corrects any misalignment of the upper, folded-over board panel relative to its lower board panel prior to pressing or boning the tape joining the board pairs together.

There is also provided by this invention a method for continuously forming unitary bonded board structures from a source of boards and a single continuous piece of tape from a tape source comprising:

(a) continuously feeding tape from a single continuous source of tape at a predetermined speed along a horizontal plane;

(b) continuously feeding board pairs at a predetermined cycle and in a predetermined orientation at said predetermined speed approximately along said horizontal plane;

(c) automatically bonding said tape to the under surface of said board pair while said tape and said board pair is being continuously conveyed at said predetermined speed approximately along said horizontal plane;

(d) after bonding said tape to the under surface of said board pair in step (c), automatically cutting said tape at a predetermined distance from the leading edge of the board pair while said board pair is being continuously conveyed at said predetermined speed approximately along said horizontal plane thereby forming a tape leader for one board pair and a tape trailer for the board pair fed along said horizontal plane in the cycle immediately preceding said former mentioned board pair;

(e) automatically pulling said tape leader over the leading edge of the board pair to which said tape leader is attached while said board pair is being continuously conveyed at said predetermined speed approximately along said horizontal plane;

(f) automatically bonding said tape leader pulled over the leading edge of said board pair in step (e) to the upper surface of said board pair while said board pair is being continuously conveyed at said predetermined speed approximately along said horizontal plane;

(g) after bonding said tape leader to the upper surface of said board pair, automatically stopping the conveying of said board pair and rigidly holding said board pair in a fixed position approximately in said horizontal plane for a predetermined length of time;

(h) during said predetermined length of time mentioned in step (g), automatically pulling the tape trailer attached to said board pair rigidly held in said fixed position over the trailing edge of said board pair;

(i) after pulling said tape trailer over the trailing edge of said board pair in step (h) and during said predetermined length of time while said board pair is being held in said fixed position, automatically bonding said tape trailer to the upper surface of said board pair thereby forming an unitary bonded board structure;

(j) after said predetermined length of time mentioned in step (g), automatically conveying said unitary bonded board structure formed in step (i) from said fixed position;

(k) repeating steps (b) through (j) of said method, thereby continuously forming unitary bonded board structures.

In a further embodiment of this invention the method further comprising:

(l) automatically blocking said unitary bonded board structure conveyed from said fixed position in step (j) while said board structure is being continuously conveyed at said predetermined speed and while one of said boards of said structure remains approximately in said horizontal plane;

(m) automatically creasing said board structure blocked in step (l) while said board structure is being continuously conveyed at said predetermined speed approximately and while one of said boards of said structure remains approximately in said horizontal plane thereby forming a gusset in said board structure; and (n) repeating steps (l) and (m) of said method thereby continuously forming unitary bonded board structures with gussets.

In a still further embodiment the method further comprising:

(o) automatically pressing said board structure creased in step (m) while said board structure is being continuously conveyed at said predetermined speed and while one of said boards of said structure remains approximately in said horizontal plane thereby forming a pressed gusset in said board structure; and (p) repeating step (o) of said method thereby continuously forming unitary bonded board structures with pressed gussets.

BRIEF DESCRIPTION OF THE DRAWINGS

FIG. 27 is a view from the operator side of the machine whereas FIGS. 1A and 1B are from the other side or power transmission side of the machine.

DESCRIPTION OF THE PREFERRED EMBODIMENTS

Figure 1A:
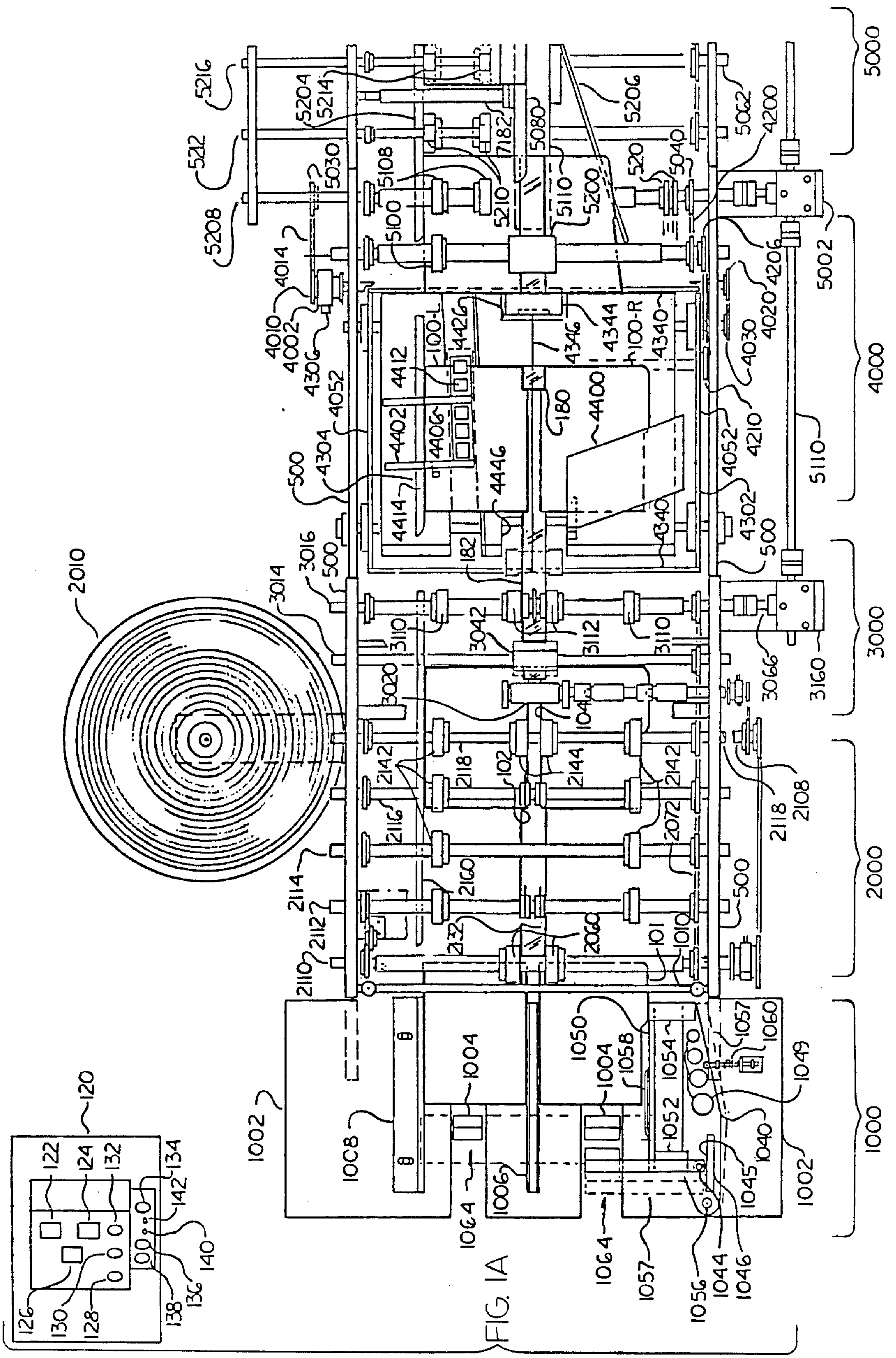
FIGS. 1A and 1B are top plan views of a machine for forming unitary bonded board structures from pairs of boards and a tape source with parts broken away or not shown to facilitate illustration of the structure.
Figure 1B:
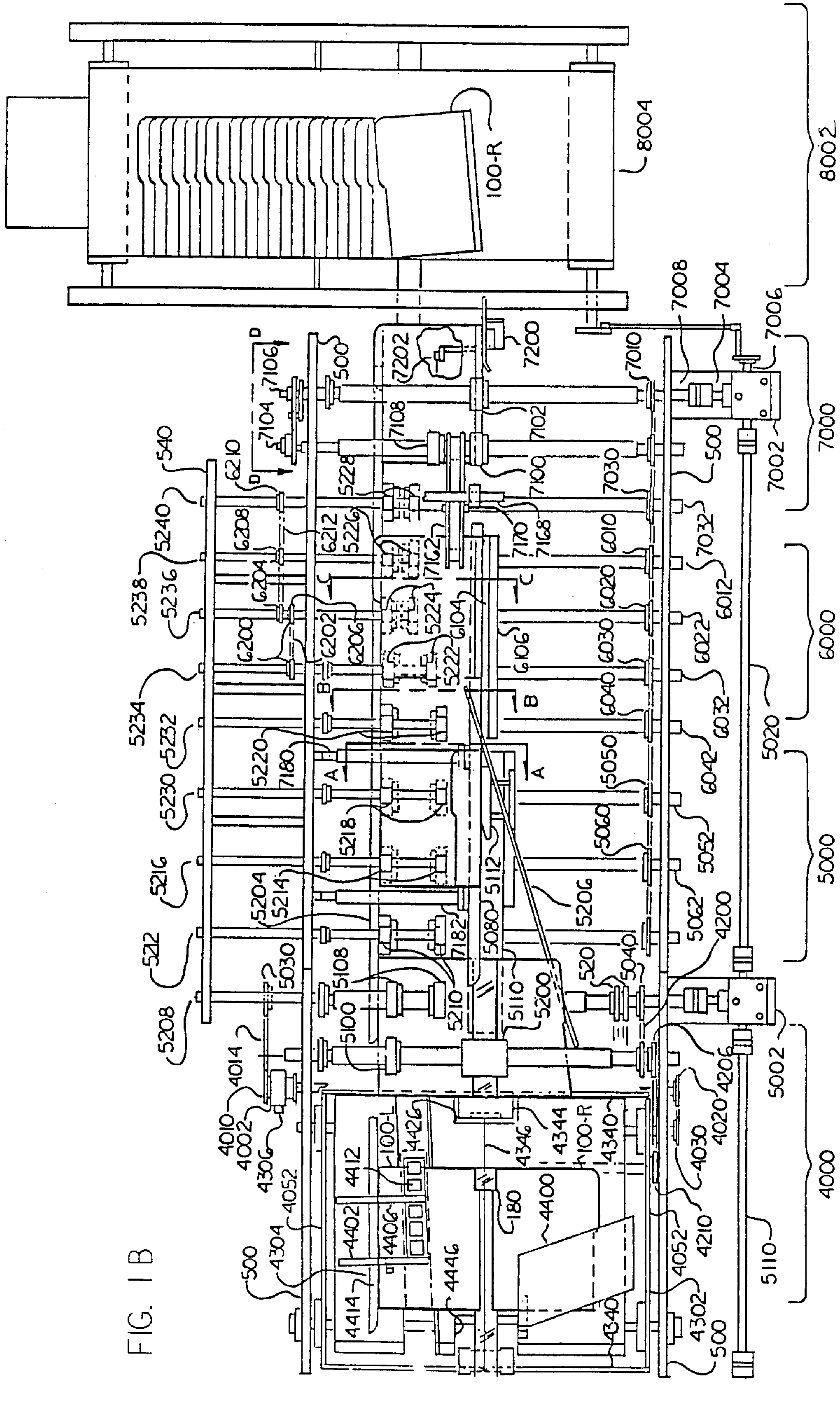
Figure 2A:
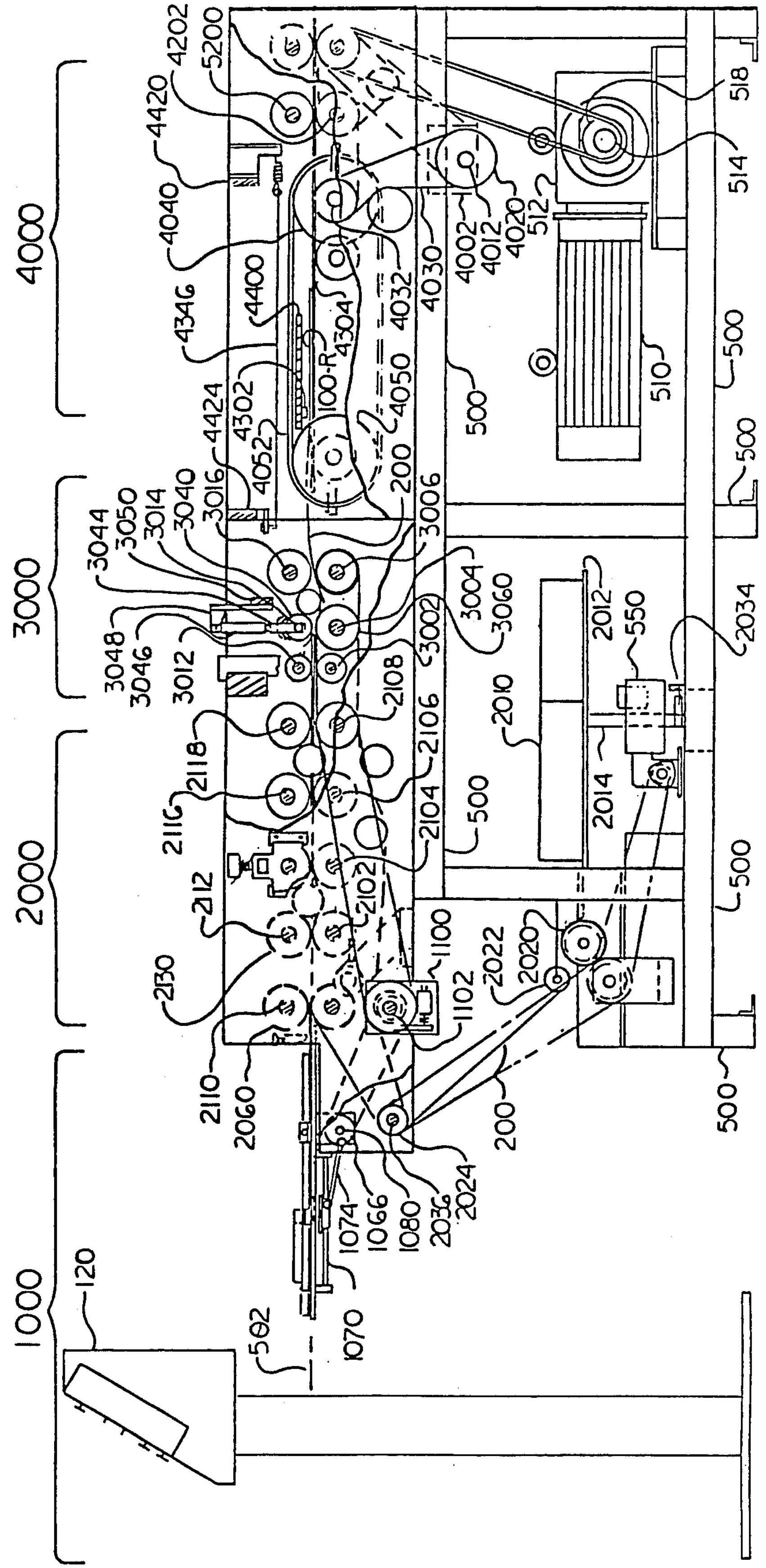
FIGS. 2A and 2B are side elevation views, partly in section, of the machine of FIGS. 1A and 1B respectively.
Figure 2B:
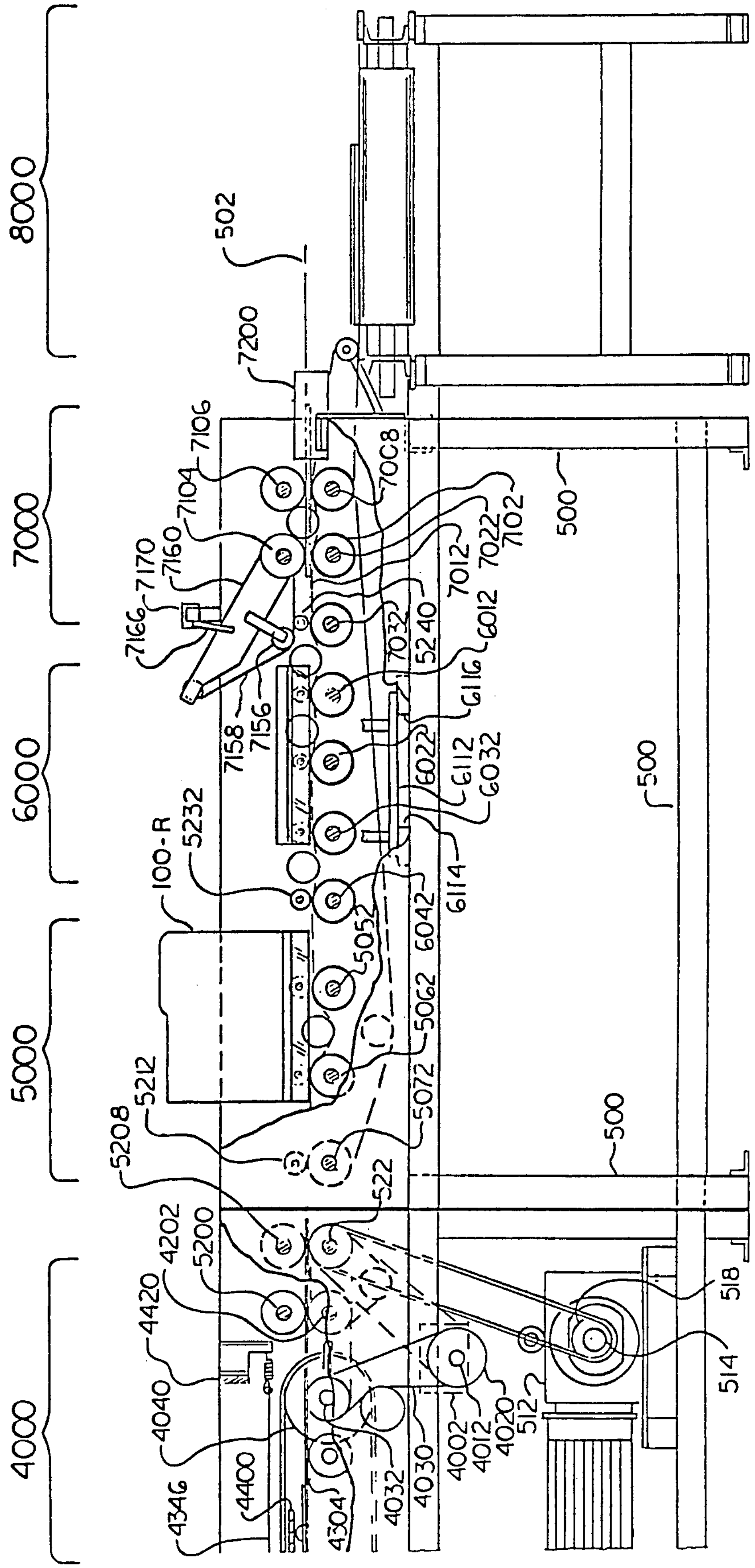
Figure 13A:
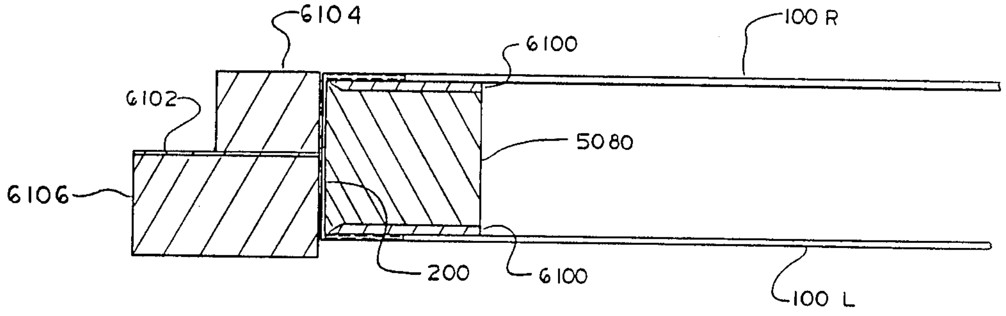
FIGS. 13A, 13B and 13C are end views, in cross section, of an unitary bonded board structure during the blocking and gusset forming operations taken along lines A—A, B—B, and C—C respectively of FIG. 1B.
Figure 13B:
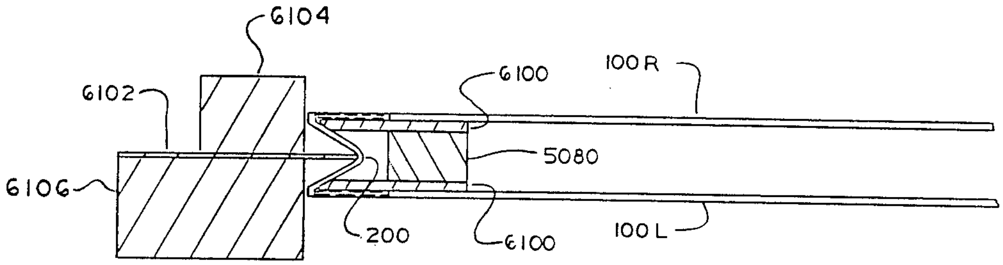
Figure 13C:
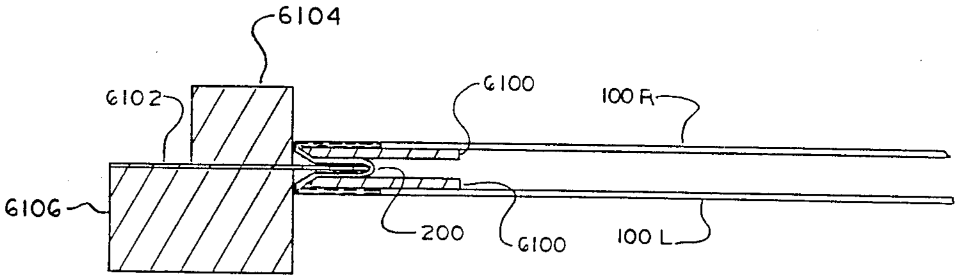
Figure 18A:
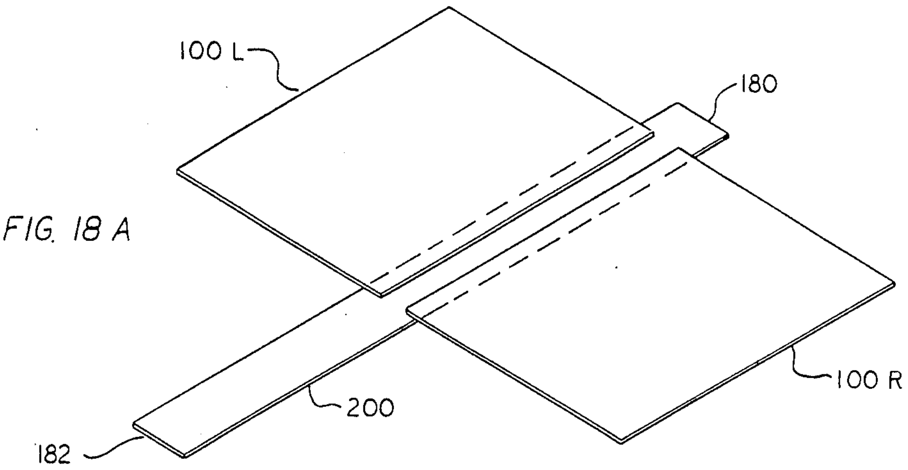
FIGS. 18A, 18B and 18C schematic diagrams of the three stages of tape wrapping of a board pair.
Figure 18B:
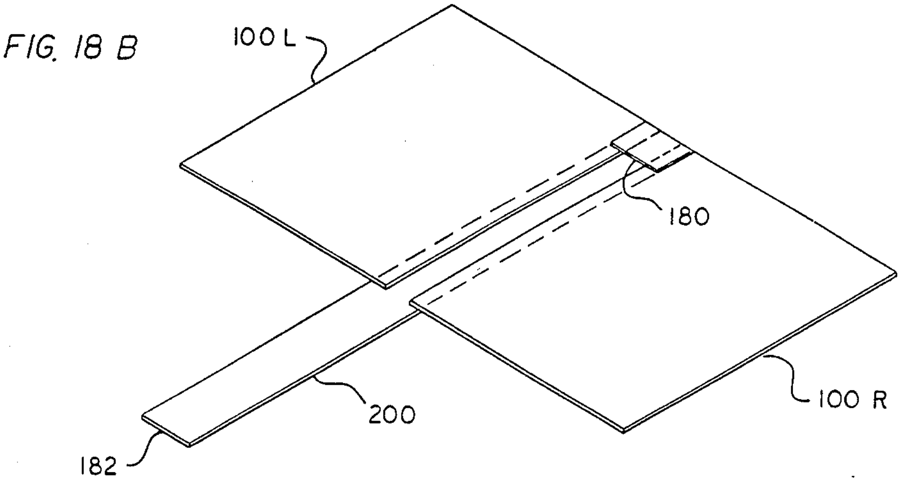
Figure 18C:
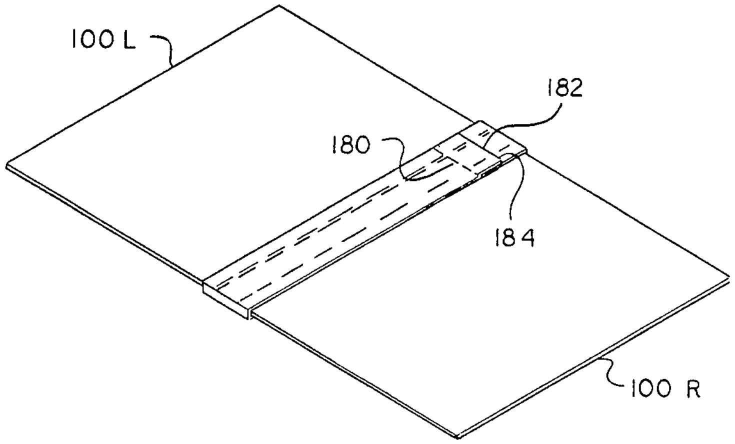
Figure 22A:
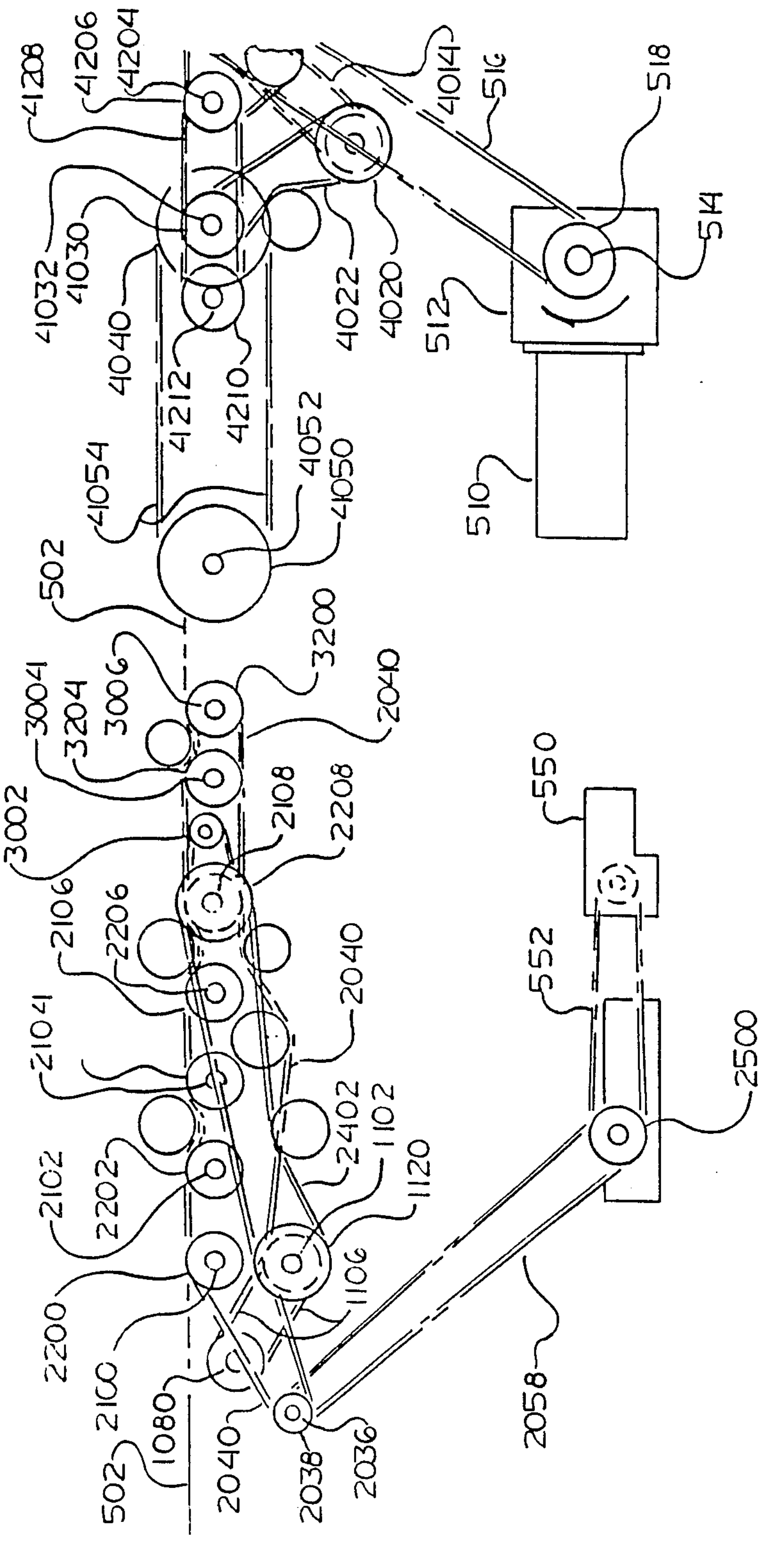
FIGS. 22A and 22B are elevation views of the shaft power transfer from main motor 510 to the various sections and mechanism of the machine.
Figure 22B:
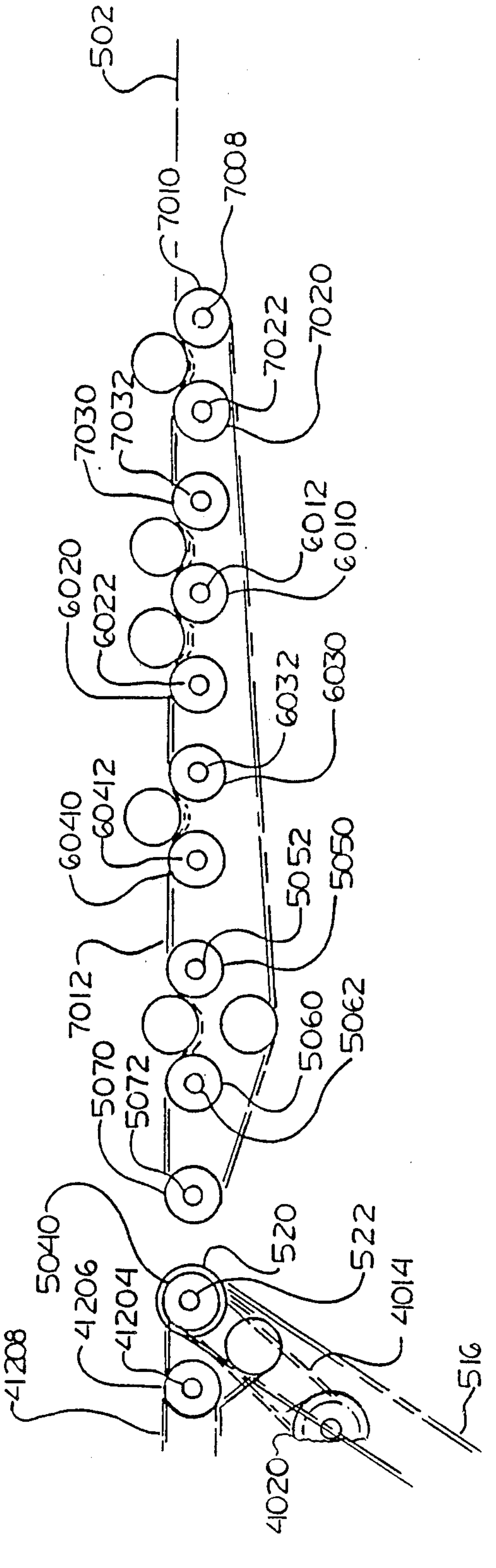
Figure 23A:
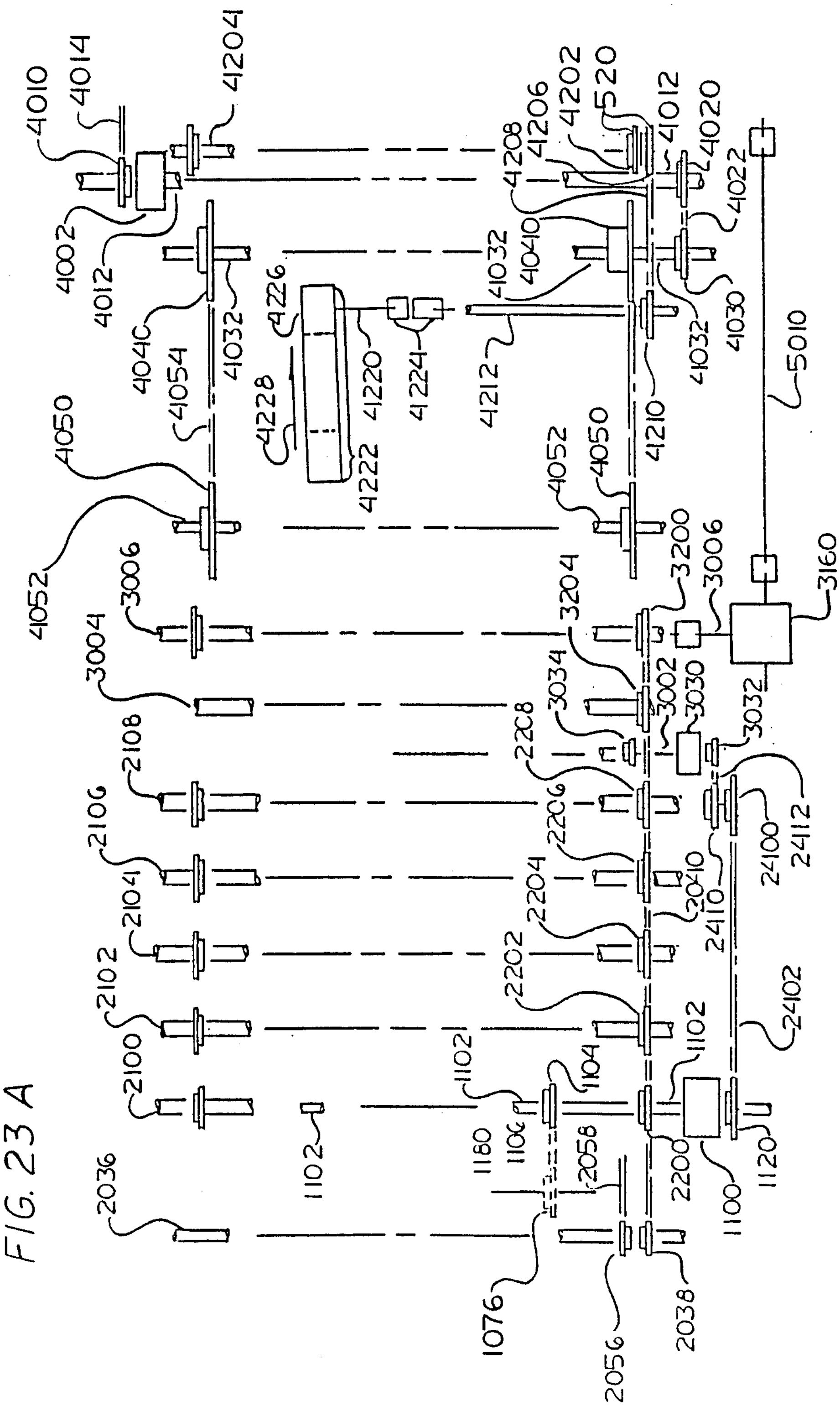
FIGS. 23A and 23B are plan views of the shaft power transfer of FIGS. 22A and 22B, respectively.
Figure 23B:
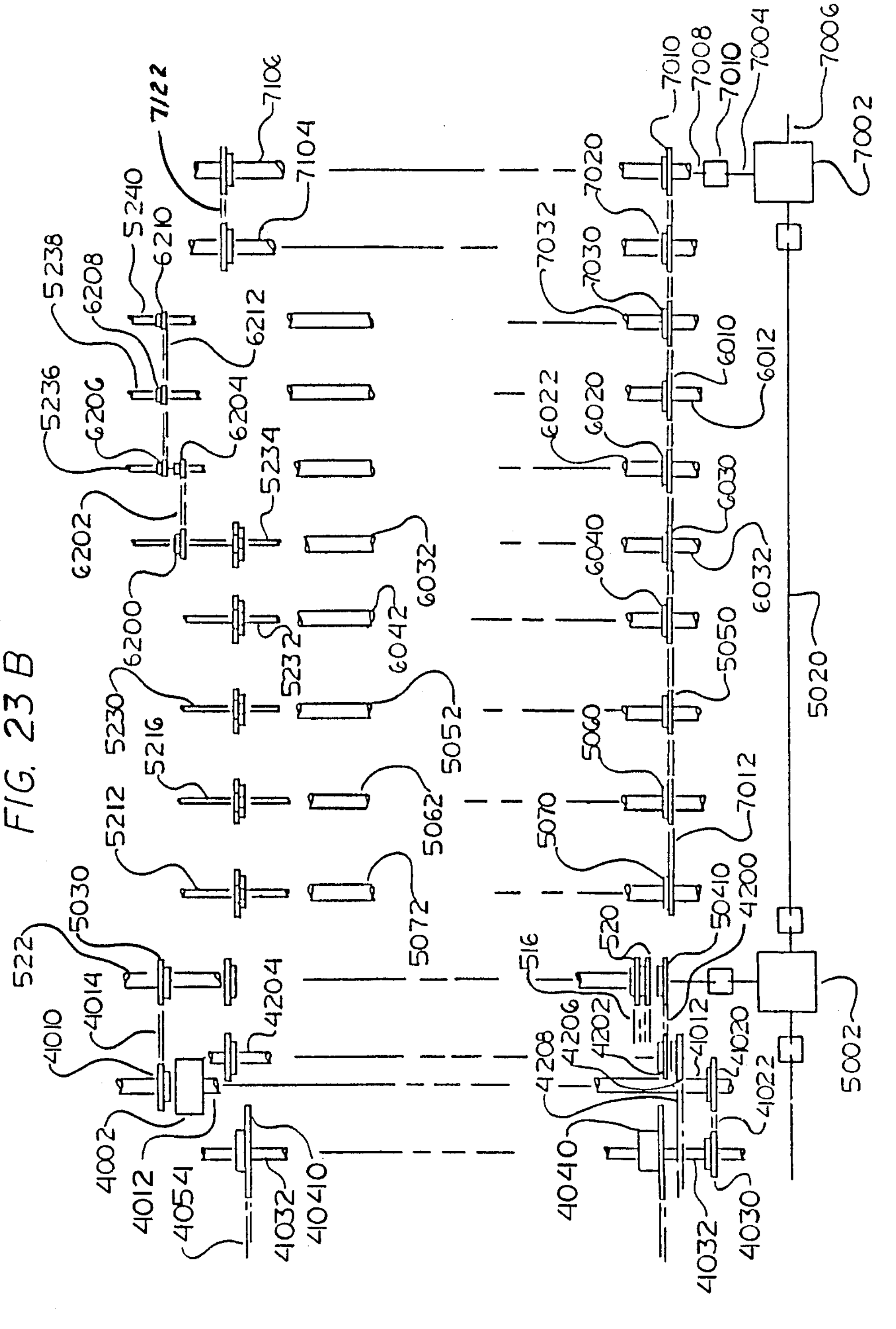

As used herein, FIG. 1 shall mean FIGS. 1A and 1B; FIG. 2 shall mean FIGS. 2A and 2B; FIG. 13 shall mean FIGS. 13A, 13B and 13C; FIG. 18 shall mean FIGS. 18A, 18B and 18C; FIG. 22 shall mean FIGS. 22A, and 22B; and FIG. 23 shall mean FIGS. 23A and 23B.

The preferred embodiment of this invention for the machine for automatically forming unitary bonded board structures is shown in FIGS. 1 and 2. Horizontal feed table 1002 and other components of the machine are rigidly supported by steel structure 500. Power is supplied to the machine by main motor 510 connected to gear box 512 having output shaft 514. Chain 516 mounted between sprocket 518 on shaft 514 and sprocket 520 on shaft 522 supply power to shaft 522. Power to the other shafts and rollers of the machine is supplied through shaft 522 by means of various gears, sprockets, gear boxes and chains as explained below. In general, except for the speed assist mechanism shown in FIG. 27, power is supplied to all lower shafts located immediately under horizontal work plane 502 of the machine as shown in FIGS. 22 and 23. In FIG. 22 the smaller circle diameter circle of a two concentric circles represents a shaft and a larger concentric circle represents a sprocket. Single circles represent tension sprockets or rollers designed to take up slack in the various chains. Tension sprockets or rollers do not have their shafts shown in FIG. 22. All chains shown in FIG. 22 rotate clockwise except for chain 552.

Shaft 522 supplies power to gear box 5002 which drives shafts 5010 and 5020 as shown in FIG. 23. Shaft 5010 supplies power to gear box 3160 which drives shaft 3006 and sprocket 3200 which is rigidly fixed to shaft 3006. Sprocket 3200 drives chains 2040 which in turn drives sprockets 3204, 2208, 2206, 2204, 2202, 2200 and 2038, which are rigidly fixed to shafts 3004, 2108, 2106, 2104, 2102, 2100 and 2036 respectively.

Shaft 2108 also drives sprocket 2400 which is rigidly mounted to shaft 2108. Sprocket 2400 drives chain 2402 which in turn drives rotating sprocket 1120 of clutch mechanism 1100. When mechanism 1100 is activated input sprocket 1120 drives shaft 1102 on which sprocket 1104 is rigidly fixed. Sprocket 1104 drives chain 1106 which in turn drives the sprocket of crank wheel 1076 as will be described later with regard to board feeding. It is to be understood that chains 2040 and 2402 rotate continuously as long as main motor 510 is driving shaft 514 but that chain 1106 moves only upon activation of clutch mechanism 1100.

Shaft 2036 also drives sprocket 2056 which drives chain 2058 which in turn drives sprocket 2500 which is rigidly fixed by shaft 2502 which enters into glue pot 2030. Connected to shaft 2502 after it enters glue pot 2030 is a vane (not shown) which rotates with shaft 2502 thereby keeping glue from hardening or caking in pot 2030. Should main motor 510 be shut off, auxiliary motor 550 having chain 552 connected to shaft 2502 can be turned on to keep the glue from hardening in pot 2030 while motor 510 and the line producing the board structures is shut down. Chain 552 is connected to sprocket 2504 located behind sprocket 2504 on shaft 2502. Sprocket 2502 and sprocket 2504 each contain an antioverrun clutch which are operable to permit free rotation of sprocket 2502 in the counter-clockwise direction and free rotation of sprocket 2504 in the clockwise direction.

Shaft 2108 also drives sprocket 2410 which drives chain 2412 which in turn drives input sprocket 3032 of cutter clutch mechanism 3030. When clutch mechanism 3030 is activated input sprocket 3032 engages output shaft 3002 of mechanism 3030. Rigidly mounted on shaft 3002 is anvil roller 3026 which lies immediately under horizontal plane 502 and tape 200. Output shaft 3002 also has rigidly fixed thereon gear 3034 which engages a similar gear on upper shaft 3012 causing cutting cylinder 3020 to rotate at the same line speed as anvil 3026. Upper shaft 3012 is connected to cutting cylinder 3020 by a pair of universal joints 3022. Although chain 2412 rotates continuously when main motor 510 is on, output shaft 3002 of clutch mechanism 3030 rotates only when mechanism 3030 is activated.

Returning to FIG. 23, shaft 522 has rigidly fixed thereto sprocket 5030. Wrapping clutch mechanism 4002 has input sprocket 4010 and output shaft 4012. Sprocket 5030 drives chain 4014 which in turn drives sprocket 4010. Rigidly fixed to the other end of shaft 4012 is sprocket 4020 which drives chain 4022 which in turn drives sprocket 4030. Sprocket 4030 is rigidly fixed to shaft 4032. Rigidly fixed to shaft 4032 are two large sprockets 4040. Upstream from sprockets 4040 are a similar pair of large sprockets, sprockets 4050 which are rigidly fixed to shaft 4052. Sprockets 4040 drive chains 4054 which in turn rotate sprockets 4050. Chains 4054 are also partly shown in FIG. 3. Although chain 4014 rotates continuously when main motor 510 is on, output shaft 4012 of clutch mechanism 4002 rotates only when mechanism 4002 is activated. Consequently chains 4054 which are ultimately driven by shaft 4012 rotate only when mechanism 4002 is activated.

Figure 3:
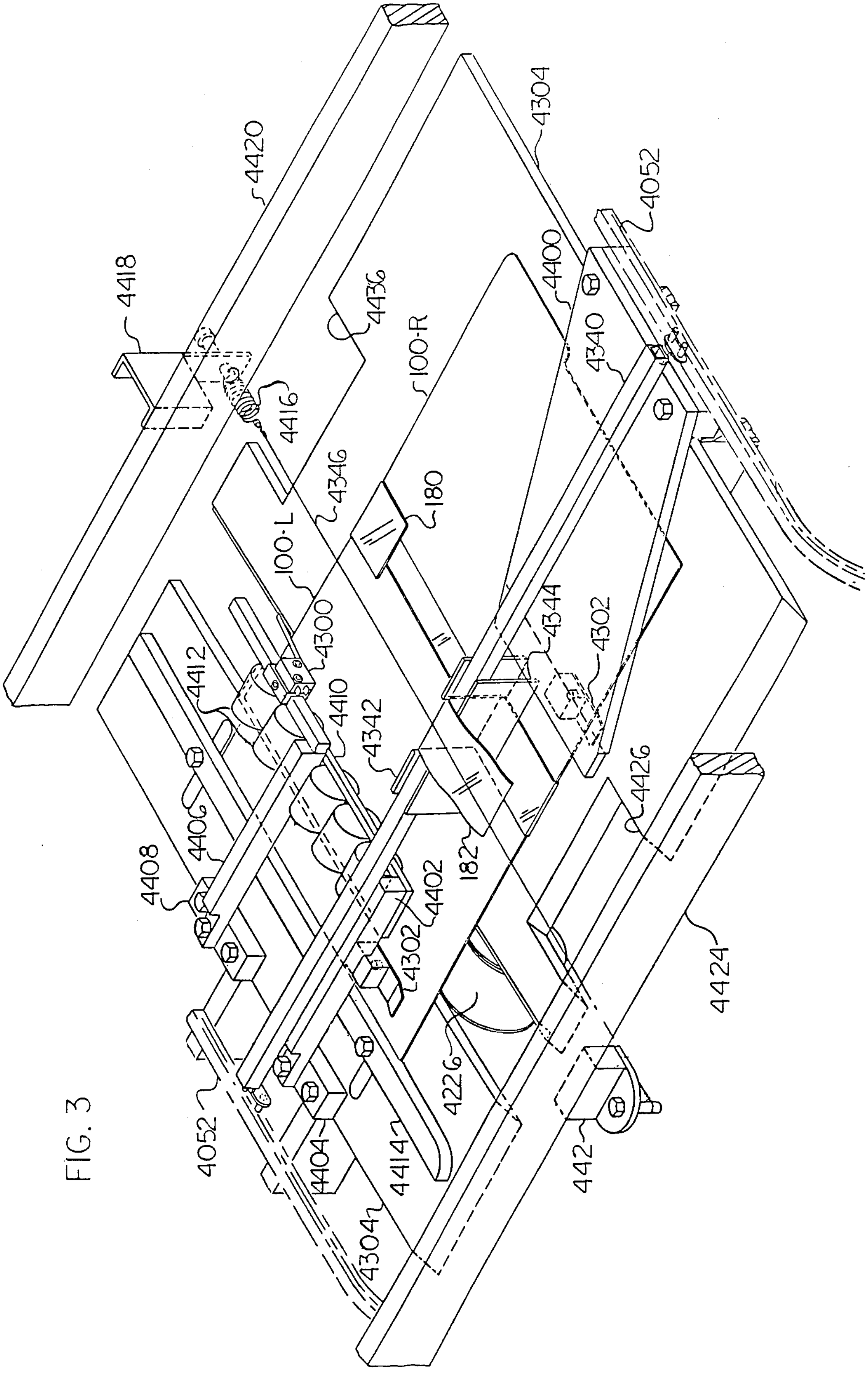
FIG. 3 is a perspective view of tape wrapping section 4000 of the machine of FIG. 1A with parts broken away or not shown to facilitate illustration of the tape wrapping section of the machine.

Rigidly fixed to shaft 522 is sprocket 5040 which drives chain 4200 which in turn drives sprocket 4202 which is rigidly fixed to and driven by shaft 4204. Shaft 4204 traverses the machine. In front of sprocket 4202 on the power side of the machine is rigidly fixed sprocket 4206 which drives chain 4208 which in turn drives sprocket 4210. Sprocket 4210 is rigidly fixed to shaft 4212. Shaft 4212 is coupled to shaft 4220 of conveyor belt mechanism 4222 by flexible coupling 4224. Shaft 4220 drives conveyor belt 4226 in the direction of arrow 4228 which is also shown in FIG. 3. Therefore, when main motor 510 is on, input shaft 4220 continuously drives conveyor belt 4226. The top surface of belt 4226 drives board 100-L through wrapping section 4000 unless the board is clamped down.

Figure 27:
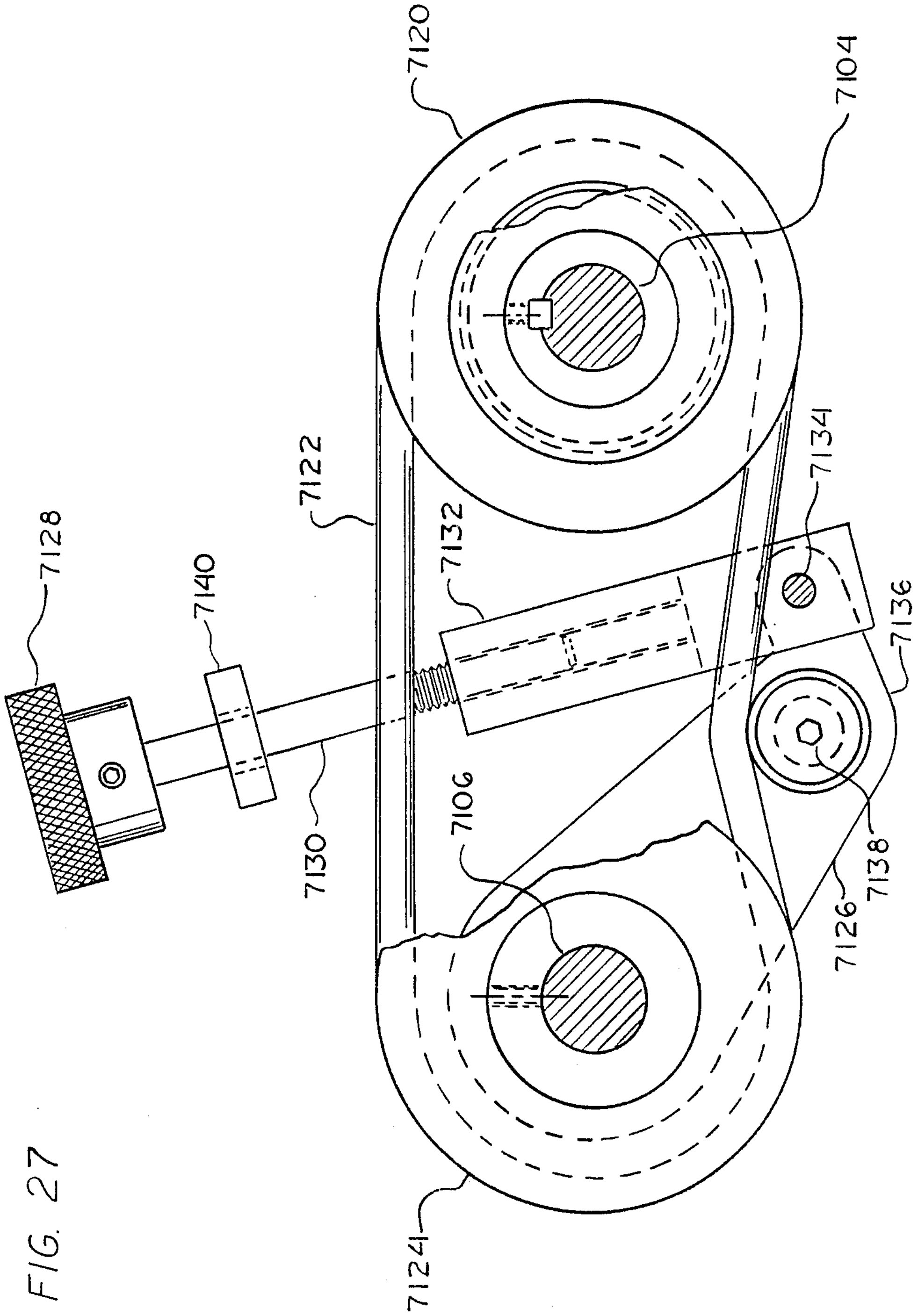
FIG. 27 is an elevational view of the subsystem of a speed assist mechanism which is responsible for increasing the rotational speed of upper shaft 7106 relative to upper shaft 7104 as seen through line D—D of FIG. 1B.
Figure 28:
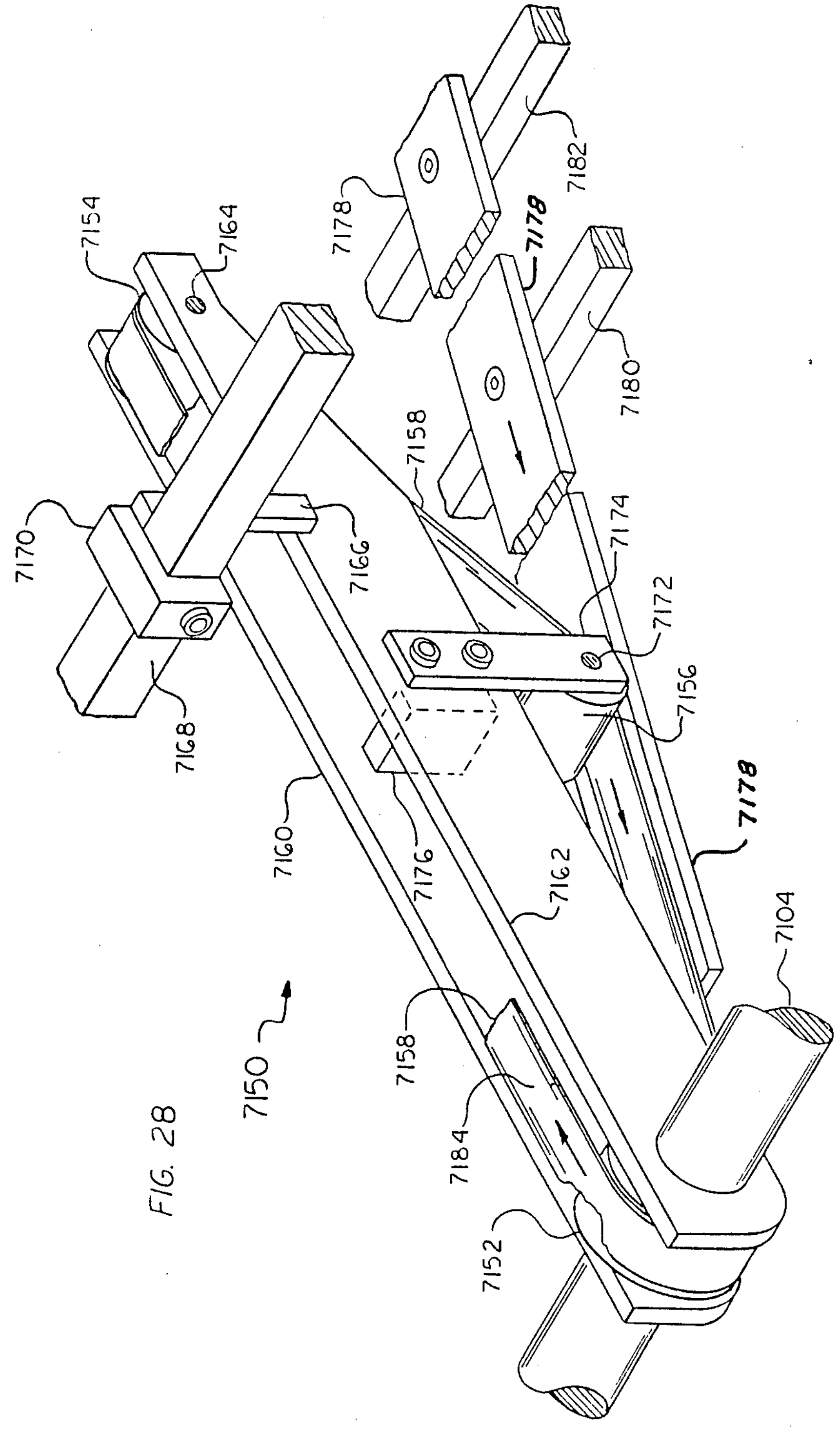
FIG. 28 is a perspective view from the operator side of the machine of the subsystem of a speed assist mechanism which is responsible for transmitting the rotational speed of upper shaft 7106 to upper, folded-over board panels.

Returning to FIG. 23, shaft 5020 drives gear box 7002 which has output shafts 7004 and 7006. Shaft 7004 is coupled to shaft 7008 by coupling 7010. Similar couplings are shown on gear boxes 3160 and 5002 and shaft 5020 connected to gear box 7002 but have not been identified by element number since the purpose and intent are the same as that for coupling 7010. Sprocket 7010 is rigidly fixed to and driven by shaft 7008. Sprocket 7010 drives chain 7012 which in turn drives sprockets 7020, 7030, 6010, 6020, 6030, 6040, 5050, 5060 and 5070 which are rigidly fixed to shafts 7022, 7032, 6012, 6022, 6032, 6042, 5052, 5062 and 5072 respectively. Upper shafts 5212, 5216, 5230, 5232, 5234, and 7106 each contain a gear, and such gears are driven each individually by gears on their opposing lower shaft 5072, 5062, 6042, 6032, and 7008 respectively. In an alternative embodiment of this invention in which the speed assist mechanism shown in FIGS. 27 and 28 is omitted (such embodiment is not shown in the figures) upper shaft 7104 also contains a gear which is driven by a gear on opposing lower shaft 7022. Returning now to FIGS. 22 and 23, sprocket 6200 is fixed to and driven by shaft 5234. Sprocket 6200 drives chain 6202 which in turn drives sprocket 6204 which is fixed on upper shaft 5236. Sprockets 6206, 6208, and 6210 are fixed to upper shafts 5236, 5238 and 5240 respectively. Sprocket 6206 drives chain 6212 which in turn drives shafts 5238 and 5240.

The machine comprises eight main sections, the first seven of which perform operations in horizontal work plane 502. Section 1000 operates to feed board pairs into laminating section 2000. Laminating section 2000 bonds tape automatically to the under surface of the board pairs. In tape cutting section 3000 the tape is cut thereby forming a tape leader for one board pair and a tape trailer for another board pair immediately downstream of the former board pair. The tape leader is then pulled over the leading edge of the board pair and bonded or ironed to the upper surface of the board pair just before the board pair exits section 3000. The tape trailer is then pulled over trailing edge of the board pair in section 4000 and bonded to the upper surface of the boards thereby completely wrapping the boards with a single piece of tape. In one embodiment the tape trailer overlaps a portion of the tape leader so that only one edge of the tape is exposed.

In section 5000 one board, board 100-R in FIG. 1, is elevated and rotated about 180° over a blocking mandrel. In section 6000 the thusly blocked unitary bonded board structure from section 5000 is creased to form a gusset. In section 7000 the board structure now containing a gusset is pressed to form an expandable board structure. In section 8000 the completed board structures from section 7000 are conveyed on batch assembly table 8002 to facilitate packaging.

Figure 4:
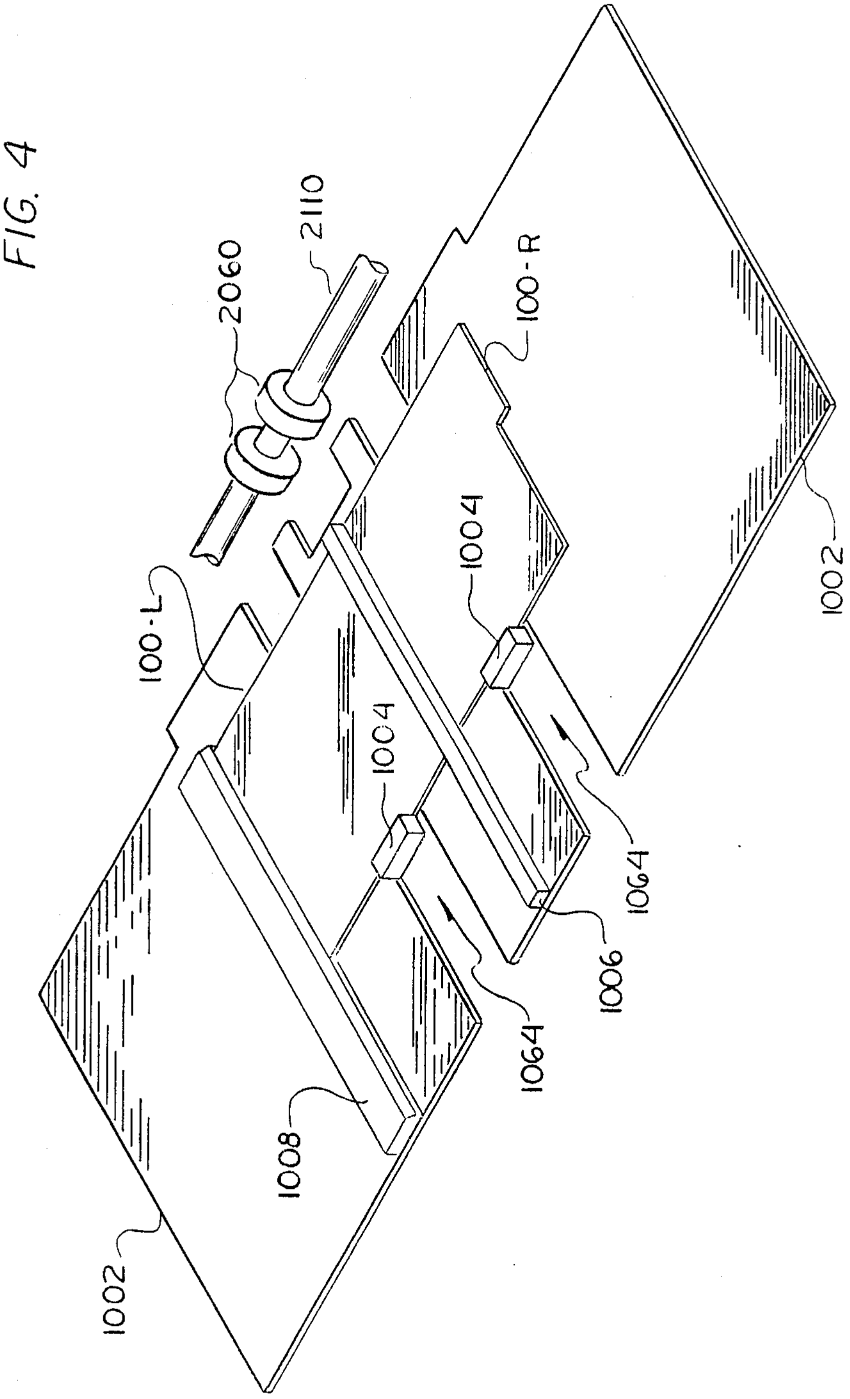
FIG. 4 is a schematic view of the principal components in the panel feeding operation of the machine.

In board feeding section 1000, board pairs 100-L and 100-R are placed on horizontal feed table 1002 preferably with an automatic board placement device (not shown). The board placement device places the boards on feed table 1002 just downstream of board pushers 1004 as shown schematically in FIG. 4. One board pusher is provided for each board. Board pushers 1004 are linked together so that each board pair is pushed into the laminating section 2000 simultaneously and in a precise orientation.

Board 100-L is constrained in its flow through board feeding section 1000 by board spacer bar 1006 and side constraint bar 1008. Bar 1008 is adjustable to accommodate boards of various widths. Board 100-R, which frequently contains a precut tab, such as tab 101, is constrained by bar 1006 and side jogger mechanism 1040 which comprises bar 1042 which is rigidly attached at one end to right board pusher 1004. Cam follower 1044 is attached to the other end of bar 1042 and rides against surface 1045 of cam 1046 which is attached to bar 1048. Side constraint bar 1050 is rigidly connected to bar 1048 by structs 1052 and 1054. Bar 1048 is pivotally mounted in relation to table 1002 by pin 1056. Leaf spring 1058, mounted on bar 1050, is designed to bear against the edge of board 100-R. Bar 1050 and leaf spring 1058 are urged against board 100-R by preload spring 1060. Bar 1048 contains several circular holes, 1049, merely to lessen its weight.

Pairs of boards are preferably placed on table 1002 automatically at spaced intervals by a placer mechanism (not shown in the drawings). As the boards are placed on the table, side jogger mechanism 1040 is pivoted outward away from board 100-R to facilitate the placement of board 100-R, which usually contains a tab, on table 1002. Mechanism 1040 is automatically pivoted outwardly by cam 1046 as cam follower 1044 reaches the end of cam 1046 that is nearest to pin 1056 as shown by dotted lines 1057, and at that instant the placer mechanism positions a new pair of boards on table 1002.

In an alternative embodiment (not shown in the drawing), side constraint bar 1008 could be replaced with a side jogger mechanism such as mechanism 1040. However, where board 100-L does not contain a tab, it has not been found to be necessary to provide a side jogger for the board placer mechanism to position a board on table 1008.

Figure 16:
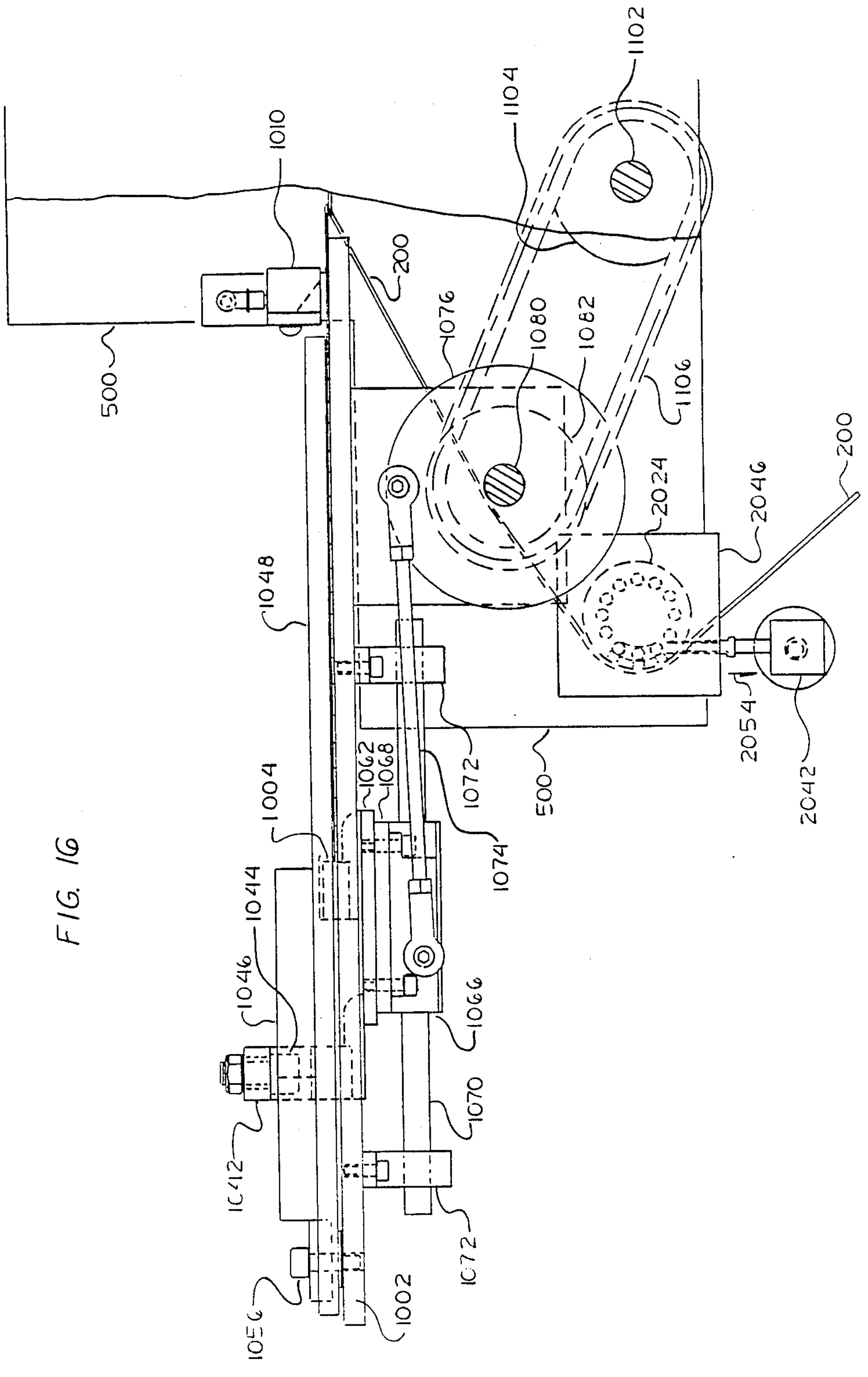
FIG. 16 is an elevation view of the board feed mechanism of section 1000 as it appears in the middle of its cycle.

Board pushers 1004 are rigidly connected to plate 1062 which is located just underneath feed table 1002 as shown in FIG. 16. Feed table 1002 contains two slots 1064 which allows pushers 1004 to extend below the upper horizontal surface of table 1002. Linear bearing 1066 is rigidly fixed to spacer plate 1068 which is rigidly fixed to plate 1062. Linear bearing 1066 contains a bore which accommodates bearing rod 1070. Bearing rod 1070 is rigidly mounted in rod blocks 1072 which are rigidly fastened to the under surface of table 1002. Connecting rod 1074 is pivotally mounted at one end to bearing 1066 and pivotally mounted at the other end to crank wheel 1076 which is axially mounted on feed crank shaft 1080. Also axially mounted on shaft 1080 is sprocket 1082 which is located behind wheel 1076 as shown in FIG. 16.

Clutch mechanism 1100, which is rigidly mounted to frame 500, comprises clutch shaft 1102 on which is axially mounted sprocket 1104. Clutch mechanism 1100 is connected to the board feeder mechanism by chain 1106 which runs between sprockets 1082 and 1104. When clutch mechanism 1100 is activated it causes shaft 1080 to make one revolution which in turn causes bearing 1066 to make one cycle of travel along rod 1070. Pushers 1004 which are rigidly connected to bearing 1066 will travel one complete cycle each time clutch mechanism 1100 is activated. On each cycle pushers 1004 move horizontally forward in horizontal plane 502 of table 1002 about four iuches thereby pushing board pairs 100-L and 100-R under adjustable entry guide bar 1010 and into laminating section 2000 whereupon the boards are driven automatically through the laminating section. Bar 1010 causes any warped or twisted boards to be guided under nips 2060. Nonlimiting examples of clutches operable for this purpose are any single revolution, properly rated, solenoid operated wrap spring clutch including Marquette CAP-6 and Warner wrap spring clutch model CB-6.

Figure 17:
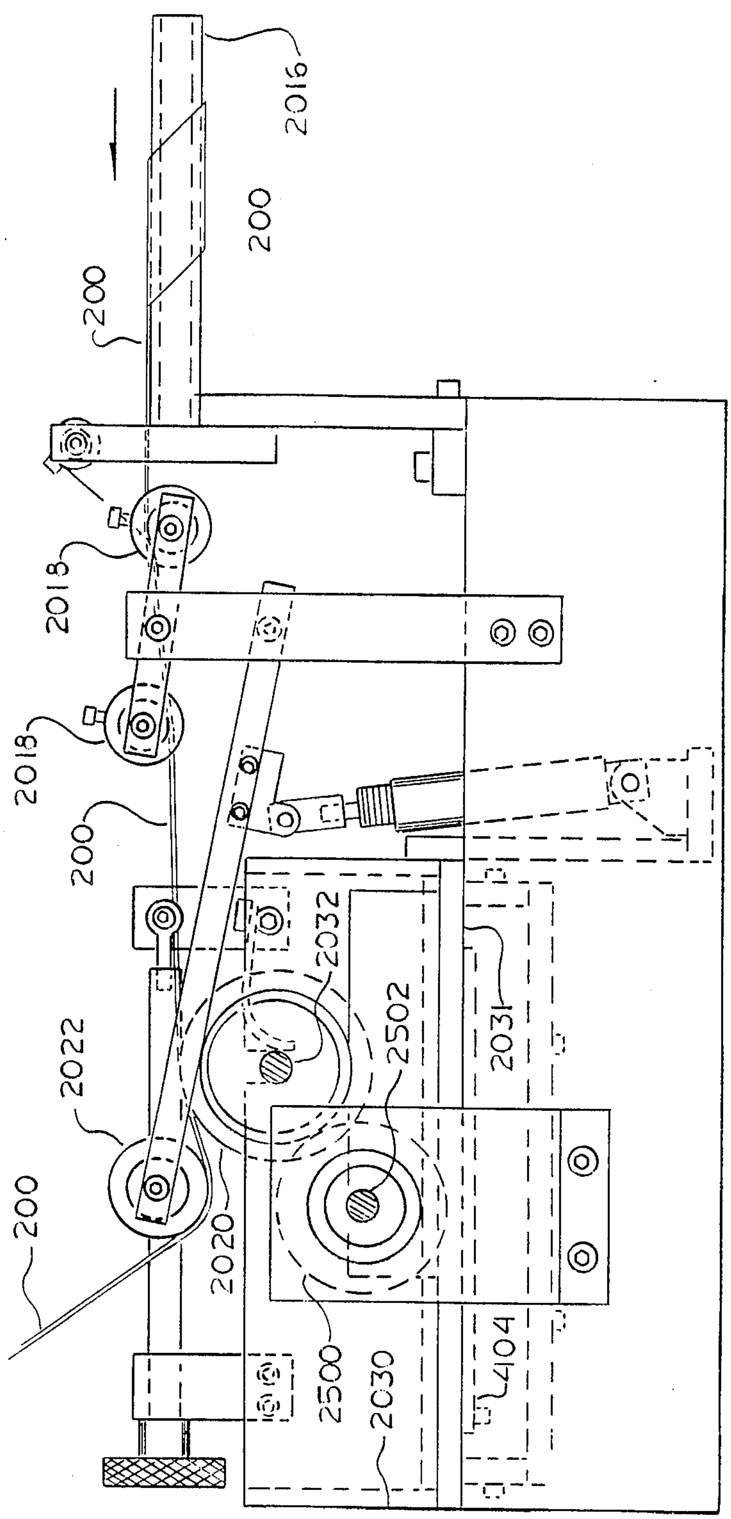
FIG. 17 is a side elevation view of the glue applicator mechanism and tape feeding.

Returning to FIGS. 1 and 2, tape 200 is automatically and continuously fed into the machine when motor 510 is running and vacuum to suction feed wheel 2024 is turned on. A source of tape, such as tape spool 2010 mounted on spindle 2012 having shaft 2014, serves to supply a continuous flow of tape to laminating section 2000 of the machine. Tape 200 from spool 2010 is first turned by right angle tape turning bar 2016 approximately 90° whereupon the tape is fed through rollers 2018 which are operable for keeping the tape taut as shown in FIG. 17. The tape then passes over the upper surface of glue applicator roller 2020 and then around guide collar 2022. The tape is then passed around suction feed wheel 2024 and then between laminating nips 2060 and 2062.

Figure 5:
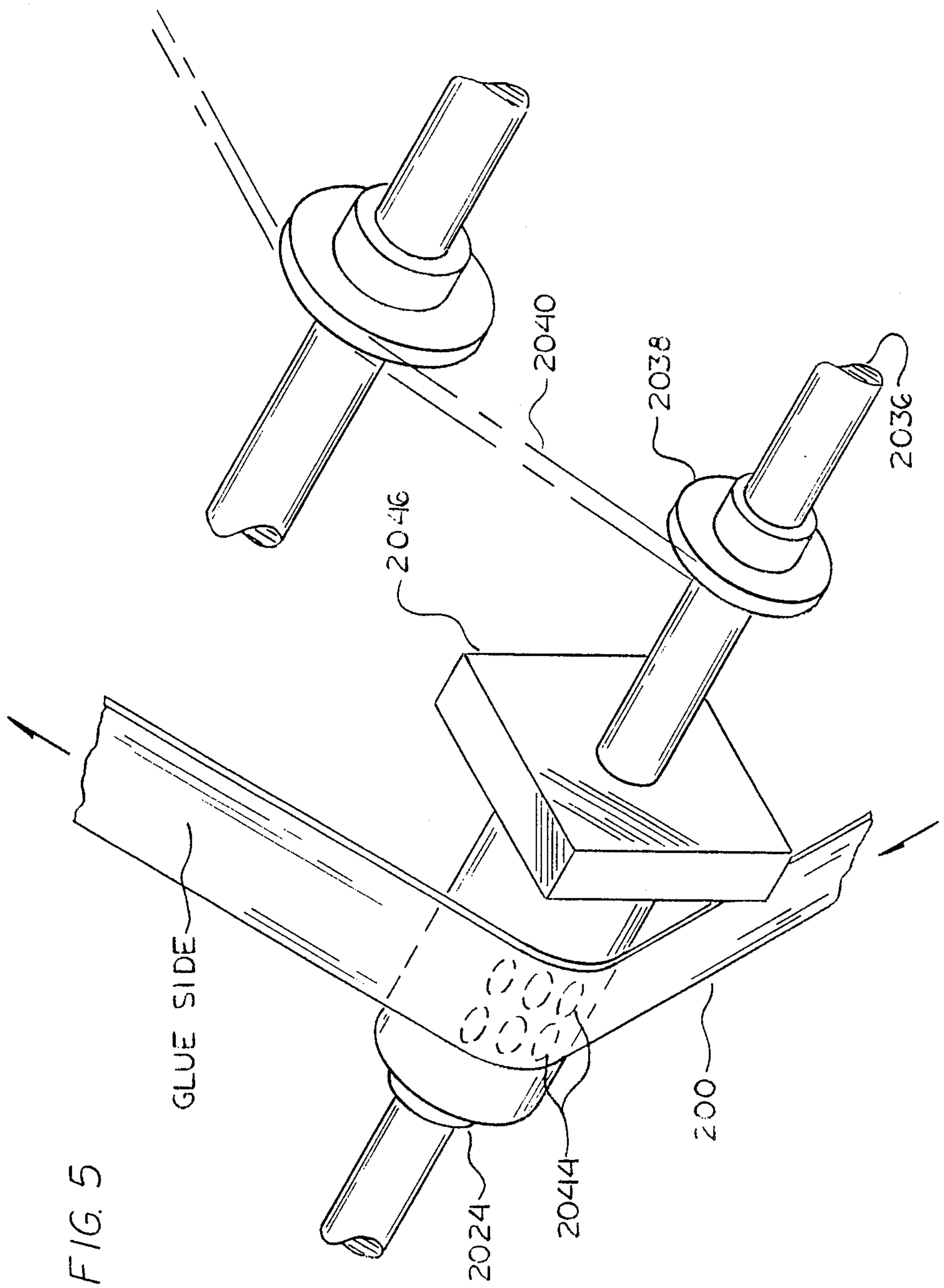
FIG. 5 is a schematic view of the tape feeding operation showing the vacuum valve and suction feed wheel.
Figure 25:
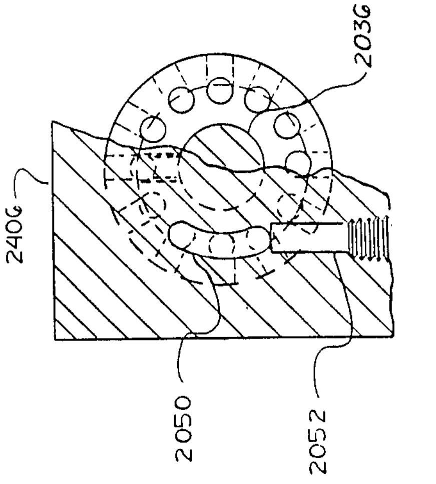
FIG. 25 is a fragmentary end view of the vacuum valve taken along line A—A of FIG. 24.
Figure 24:
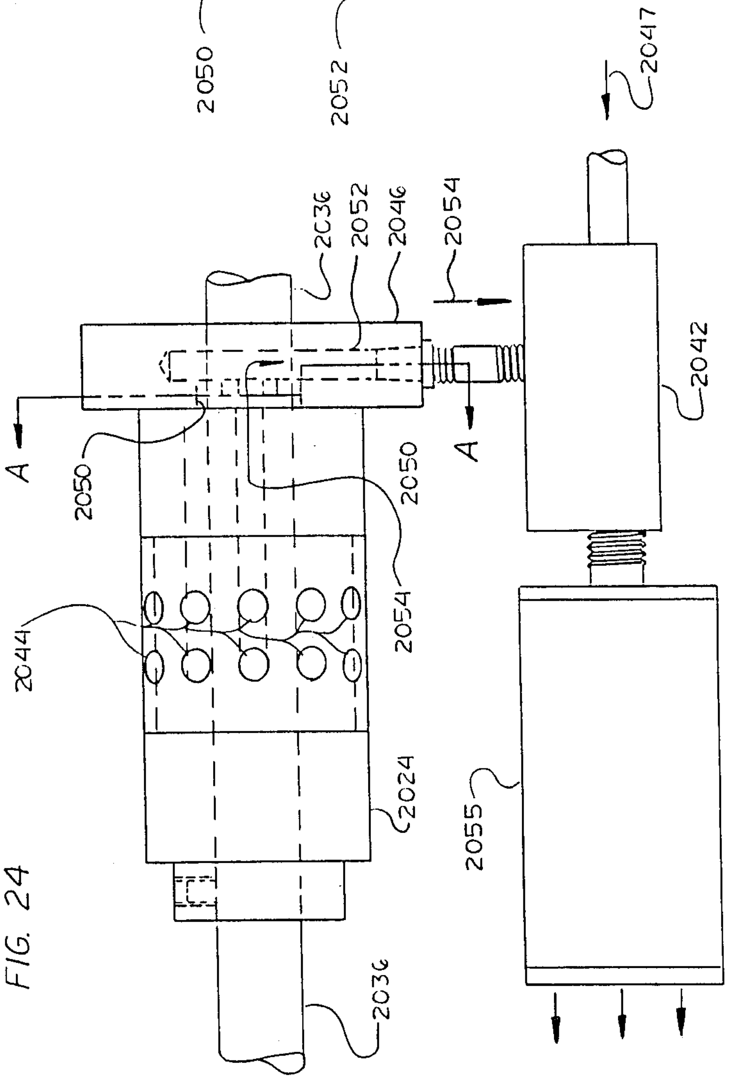
FIG. 24 is an elevational view of vacuum valve and suction feed wheel 2024.

Between spools 2018 and collar 2022, glue is applied to one side of the tape. Glue contained in glue pot 2030 is picked up by the lower surface of glue applicator roller 2020, which rotates on shaft 2032, is transferred to tape 200 just before the tape passes under collar 2022. To keep tension on the spool of tape, shaft 2014 contains adjustable tension brake 2034 which can be manually adjusted to provide just enough drag to the shaft 2014 to keep a slight tension on tape 200 as it is pulled by suction feed wheel 2024 off spool 2010 and over roller 2020. Wheel 2024 is continuously driven at the line speed of section 2000 by shaft 2036. Sprocket 2038 mounted on shaft 2036 is driven by chain 2040 as shown in FIG. 2 and schematically in FIG. 5. Vacuum generator 2042 pulls a suction on wheel 2024 which contains radially extending holes 2044 as shown in FIGS. 24 and 25. Tape 200 is held against wheel 2024 by the suction applied to the tape through holes 2044 so that as shaft 2036 rotates tape 200 is pulled off of spool 2010. Vacuum generator 2042 comprises a venturi (not shown in the figures) through which compressed air flows as shown by arrow 2048 thereby producing a vacuum at the throat of the venturi to which is connected valve mechanism 2046 which in turn is connected to holes 2044. When vacuum button 130 on control console 120 is "ON," solenoid valve 2080 is opened which allows pressurized air to flow therethrough to vacuum generator 2042. If vacuum button 130 is not in the "ON" position tape will not be fed into the machine. As shown in FIG. 24, valve mechanism 2046 permits the vacuum to be pulled only on holes 2044 which are in communication with channel 2050 recessed in the valve body of mechanism 2046 and in communication with bore 2052. The vacuum is pulled in valve 2046 by generator 2042 in the direction of arrows 2054 as shown in FIGS. 16 and 24. Downstream of vacuum generator 2042 is muffler 2055.

Figure 6:
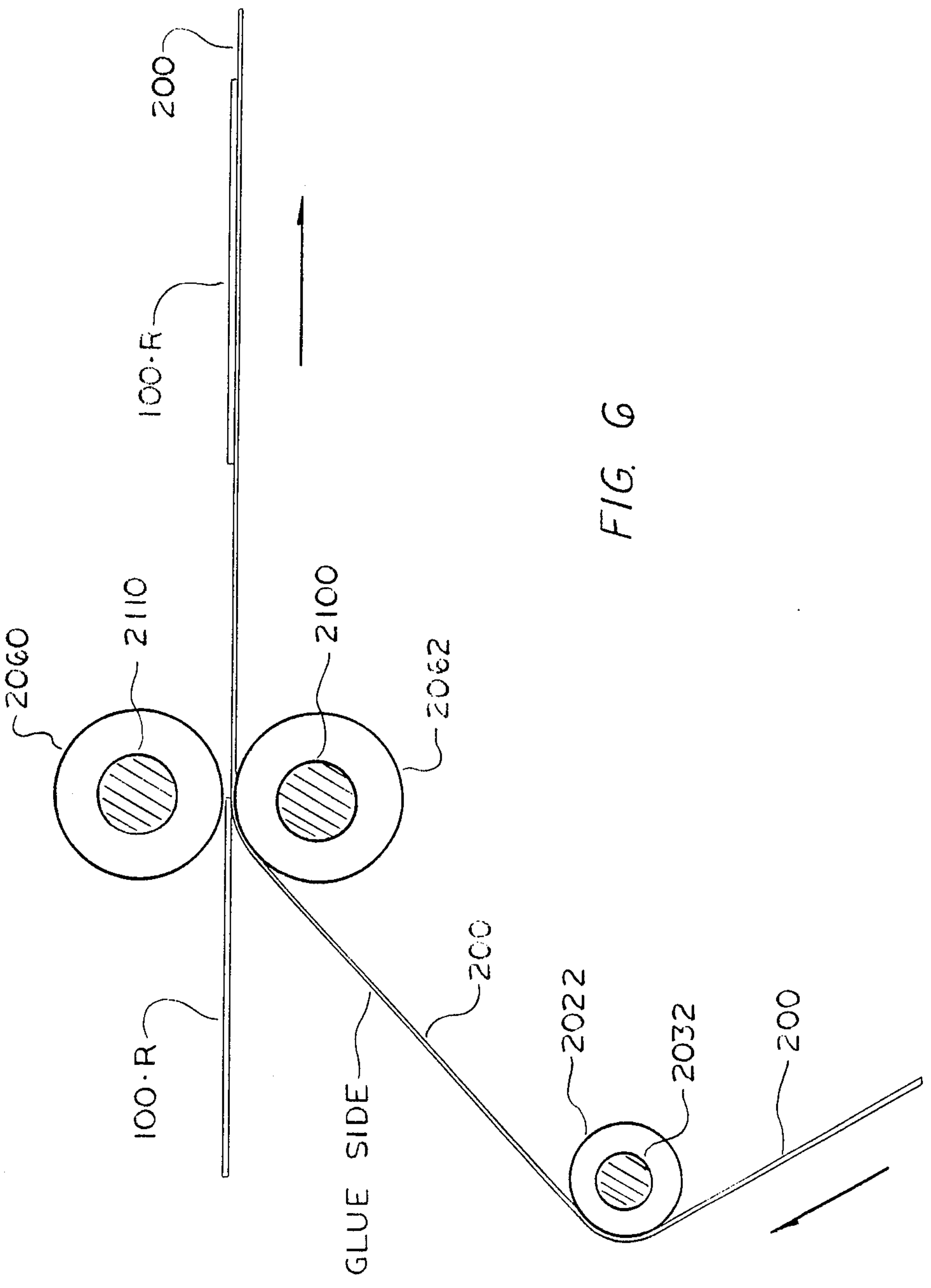
FIG. 6 is a schematic view, in side elevation, of the laminating operation in which tape is bonded to the under surface of boards.

As mentioned earlier, tape 200 is fed from wheel 2024 to between guide nips 2060 and 2062 as shown in FIG. 1 and schematically in FIG. 6. Lower shafts 2100, 2102, 2104, 2106, and 2108 in laminating section 2000 immediately under horizontal plane 502 are driven by chain 2040. Each of shafts 2100, 2102, 2104, 2106, and 2108 is geared to corresponding or opposing upper shaft 2110, 2112, 2114, 2116, and 2118 respectively. The shaft 2112 contains a pair of nips 2130 with inwardly directed shoulders 2132 which serve to guide the tape centrally through laminating section 2000 and approximately in horizontal plane 502. Shafts 2114 and 2116 contain pairs of guiding nips 2140 which serves to guide the boards and tape close to each other as they flow along horizontal work plane 502 of the machine. Shafts 2114, 2116 and 2118 contain three pairs of positive transport nips 2142 which serve to convey board pairs 100-L and 100-R through section 2000 and in horizontal plane 502. Shaft 2118 contains a pair of laminating nips 2144 which bond tape 200 to the under surface of the board pair. As board 100-L is conveyed in horizontal work plane 502 of the machine by nips 2142 it is constrained by adjustable side guide 2160. Board 100-R having been at least partly bonded to tape 200, which is at least partly bonded to board 100-L, does not need to be side constrained.

Tape 200 is bonded or laminated to the under surface of board 100-L a predetermined distance traversely spaced from inner longitudinal edge 102 of board 100-L. Tape 200 is also bonded to the under surface of board 100-R a predetermined distance traversely spaced from inner longitudinal edge 104 of board 100-R. In most applications the predetermined distances that the tape covers on boards 100-L and 100-R are equal so that the tape extends beyond the traverse gap between the boards an equal distance on each board. However, it is not necessary that the width of board covered by the tape on one board be the same as on the second board of a board pair. If desired the tape can be made to cover a greater width on one board than the tape covers on the other board simply by readjusting nips 2060, 2130, 2140, and 2144 on shafts 2110, 2112, 2114, 2116 and 2118 respectively.

The tape used to produce the unitary bonded board structures need not be a tape to which glue must be applied immediately before used as described in the description of FIG. 17, rather, preglued tape can be used if desired. Alternatively the tape can be a heat setting tape if desired. Heat can be applied to the tape and the board by radiation or conduction or any other means. For example, in one embodiment laminating nips 2144 can be heated to an elevated temperature operable for bonding a heat setting tape to the boards. The nips can be heated electrical or by hot heat circulating fluid if desired or any other means of providing heat to nips 2144. In addition to heating nips 2144 the other nips upstream of nips 2144 can also be heated to effect the bonding of a heat-setting type of tape.

Figure 26:
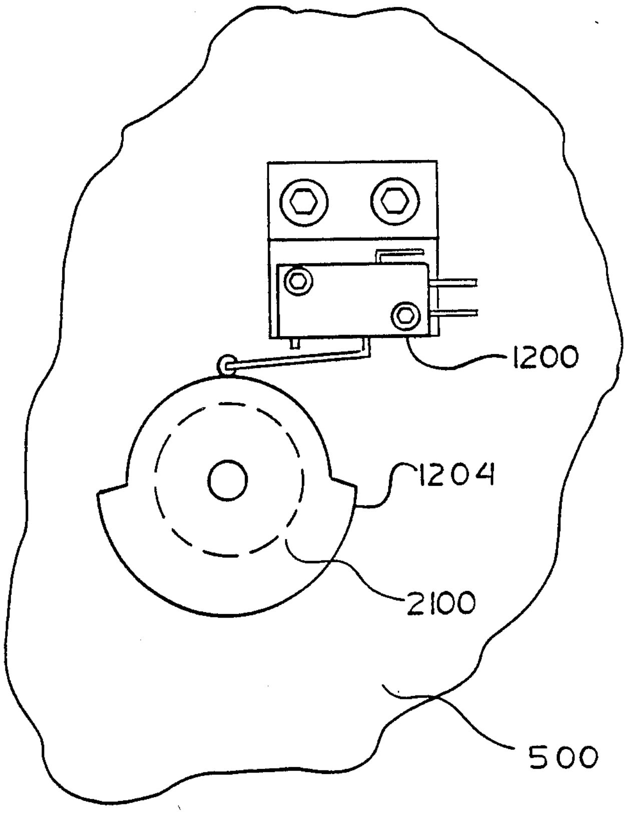
FIG. 26 is a detail of cam 1204 and switch 1200 on shaft 2100.

Returning to the placement of board pairs on table 1002 prior to such board pairs being pushed into section 2000 by pushers 1004, it is necessary to coordinate such board placement with the operation of the pushers. Boards can, of course, be placed on table 1002 manually by an operator. However, in a preferred embodiment the boards are placed on table 1002 automatically by a placer mechanism. A nonlimiting example of a placer mechanism for board pairs is a Minnesota Automation Placer, model entitled "Two Head Reciprocating Vacuum Placer" hereinafter referred to as "MAP." The MAP is a device that through levers containing suction cups, will pick up board pairs and deposit them in a predetermined orientation on table 1002 just ahead of pushers 1004. The MAP has its own vacuum pump, power drive, and controls. To coordinate the placement of boards by the MAP on table 1002, the MAP is activated by limit switch 1200. On the left end of feeder drive shaft 1102, i.e., the end nearest bar 1008, is axially mounted cam 1204 which is designed to trigger limit switch 1200 once for every revolution of shaft 1102; see FIGS. 16 and 26. Cam 1204 is designed to activate the MAP just as joggers mechanism 1040 is pivoted outwardly and as pushers 1004 are positioned furthest to the left in FIG. 1. Immediately upon the activation of limit switch 1200 the MAP picks up a pair of boards and places them in proper orientation on table 1002. The boards are picked up by the MAP by vacuum suction cups attached to the ends of a lever system which travels between two separate source piles of boards stored by the MAP and table 1002. One pile of boards contains only 100-L shaped boards and the other pile 100-R shaped boards. The vacuum to pick-up suction cups of the MAP is automatically broken, and the boards released immediately after placing the boards on table 1002 by the automatic controls of the MAP. The suction cups of the MAP then return to the two board source piles and pick up another pair of boards. Upon activation on the next revolution of shaft 1102, of switch 1200, by cam 1204, the suction cups of the MAP deliver another pair of boards to table 1002. The process is repeated on each revolution of shaft 1102. Input sprocket 1120 of mechanism 1100 runs continuously as long as main motor 510 machine is on; however, output shaft 1102 and chain 1106 do not rotate until mechanism 1100 is activated.

As described above, board feeding into lamination section 2000 occurs intermittently while tape feeding occurs continuously as long as main motor 510 is on. It is necessary to feed the board pairs at a specific point after a predetermined length of tape has been fed. In the preferred embodiment of the invention one piece of tape is wrapped completely around the board pair. The wrapping is conducted in three stages as shown in FIG. 18. In FIG. 18A the tape is bonded to the under surface of the boards. In the second stage tape leader 180 is bonded to the upper surface of the boards as shown in FIG. 18B. In the third stage, tape trailer 182 is bonded to the upper surface of the boards so that it overlaps tape leader 180 as shown in FIG. 18C. Thus a specific amount of tape, depending on the length of the boards, is required per board pair. For standard length letter size file folders about 25 inches of tape is required per board pair. This will permit the tape trailer to overlap the tape leader thereby producing a strong and attractive file folder having only one exposed tape edge for a completely wrapped and bonded folder, namely edge 184.

To coordinate board feeding with tape feeding, the machine is equipped with a tape measuring system which triggers the board feeding system. As described above, clutch mechanism 1100 upon activation will feed one board pair into laminating section 2000.

Figure 19:
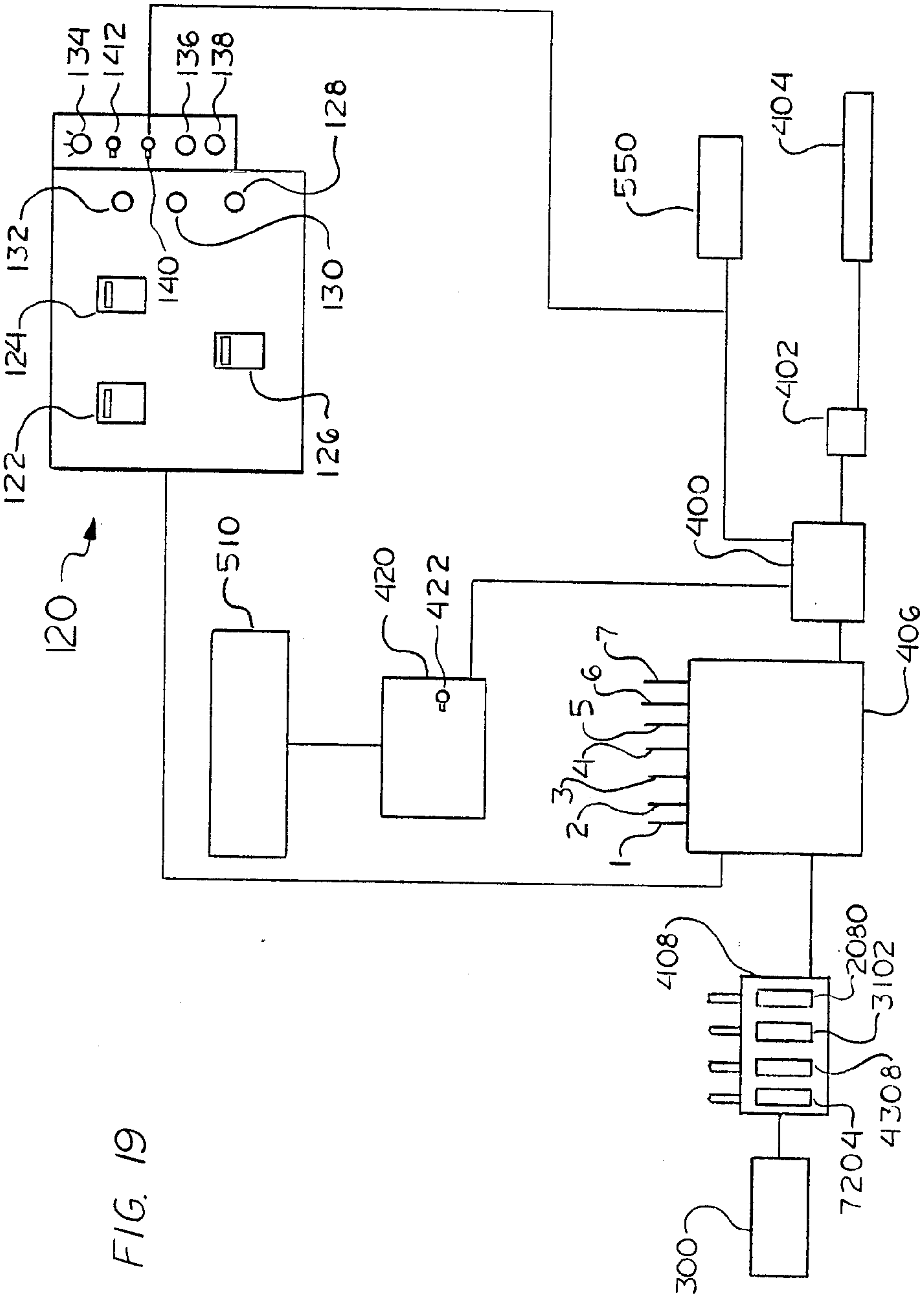
FIG. 19 is a schematic of the electrical and pneumatic control system for the machine.
Figure 20:
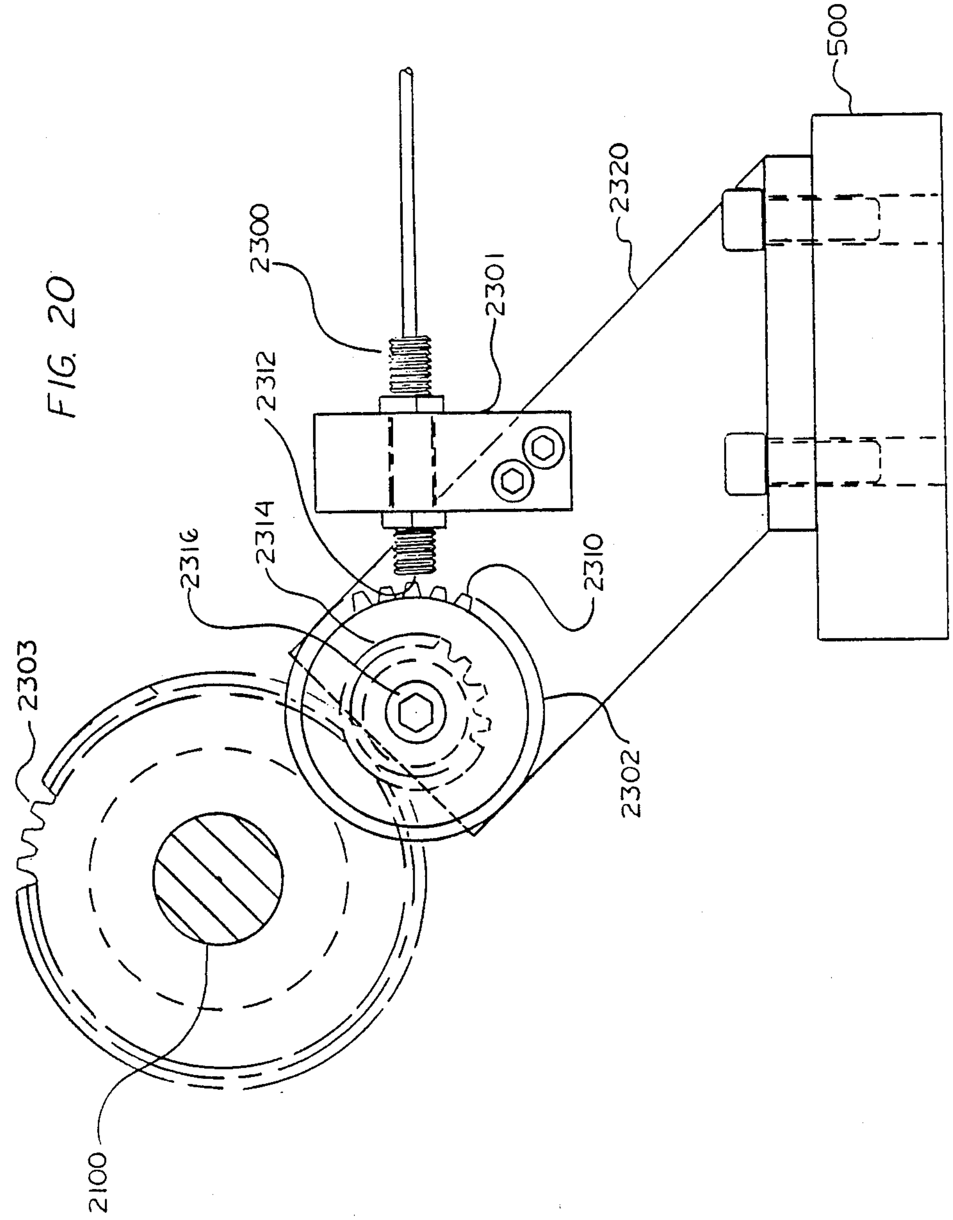
FIG. 20 is an elevational detail of proximity sensor and proximity gear located in section 2000.

The amount of tape fed to the machine is measured by a system comprising proximity sensor 2300, proximity gear 2302, ratio gear 2304, and predetermined tape feed signal counter or tape counter 122 as shown in FIGS. 19 and 20. Proximity sensor 2300 counts the teeth, specifically teeth 2310 in the face of gear 2302 as such teeth rotate past face 2312 of sensor 2300. Gear 2314 is traversely displaced along shaft 2316 from gear 2302. Gear 2302 is driven by gear 2304 which is mounted on the end of shaft 2100, the first lower shaft in section 2000. Plate 2301, which holds sensor 2300, and gear 2302 are mounted on brace 2320 which in turn is mounted on frame 500 of the machine. Gears 2302 and 2304 are designed so that each tooth 2310 as it passes by sensor 2300 corresponds to 0.1 inches of tape positively fed by tape suction wheel 2024 into laminating section 2000. Tape suction wheel 2024 is driven at line speed so that tape is continuously fed into section 2000 at line speed thereby not requiring board pairs to pull the tape off spool 2010 and over glue applicator roller 2020.

Sensor 2300 sends an electrical signal, which corresponds to 0.1 inches of tape fed to section 2000, to tape counter 122 located in operator control console 120. Counter 122 has a predetermined set point which corresponds to 0.1 inches of tape fed to section 2000. Counter 122 is designed to count down from its set point to zero. In one embodiment for letter size folders, the set point of feed counter 122 is set to 250 which corresponds to 25 inches of tape. When feed counter 122 reaches zero it sends an electrical signal to panel feed clutch mechanism 1100 which activates mechanism 1100 and causes one pair of panels to be fed into section 2000. Upon reaching a count of zero, feed counter 122 activates clutch 1100 as described and resets itself to 250. Counter 122 then counts down from its set point of 250 to zero as additional tape is fed into section 2000. The process is repeated every time feed counter 122 reaches zero thereby automatically feeding a board pair into section 2000 and resetting cutter counter 124 upon the feeding of a predetermined amount of tape into section 2000. Feed counter 122 can be set for various set points so that letter and legal size boards, or any other side boards, can be fed automatically into the machine per predetermined amount or inches of tape and completely wrapped with a single piece of tape as will be explained below.

A nonlimiting example of a proximity sensor or switch operable for this use is switch model SO 08, type 890 sold under the trademark HECON. A nonlimiting example of an electronic keyboard preset counter operable for this use, i.e., as counter 122, is model series GO 711.100 type 890 sold under the trademark HECON.

After the board pair are conveyed from the laminating section 2000 by transport nips 2142, the boards, with tape attached to the under surface thereof and extending both upstream and downstream of the board pair, enters tape cutting section 3000 which comprises lower shafts 3002, 3004, 3006 and upper shafts 3012, 3014, and 3016. All shafts are ultimately supported by frame 500. Shafts 3002, 3004, 3006, 3014 and 3016 extend completely across the machine and through the frame 500 on both sides of the machine. Shaft 3012, which comprises two universal joints 3021 does not extend completely across the machine but rather extends through frame 500 on the drive side and is supported a short distance beyond the center line of the machine by support member 502 and members 504 which is shown as a fragmentary view in FIG. 1 and in FIG. 21. Shaft 3012 contains die rule cutting cylinder 3020 which contains die rule 3022 for cutting the tape a predetermined distance ahead of the advancing leading edge of the board pair. For example, in the embodiment for producing letter size file folders, cutting cylinder 3020 is caused to cut the tape about 1.75 inches downstream of the leading edge of the advancing board pair thereby forming a tape leader about 1.75 inches long.

To coordinate cutting of the tape at a predetermined time when the leading edge of the board pair is a predetermined distance from the vertical plane of the axis of shaft 3014 which contains the cutting cylinder 3020 and to produce a tape leader of a predetermined length, the amount of travel of the leading edge of the board pair from its rest position on table 1002 just prior to being fed into section 2000 to a predetermined point along the horizontal plane of travel of the board pair in the machine is measured (by sensor 2300) and used to control the cutting of the tape. For example, in the embodiment producing letter size file folders, the predetermined distance along the horizontal plane is about 20 inches downstream from the leading edges of the board pair as the boards wait on table 1002 to be pushed into section 2000. This predetermined distance is measured by predetermined tape cutter signal counter or cutter counter 124 located in the face of operator control console 120 shown in FIG. 19. Other major components of the tape cutting system are proximity sensor 2300, gears 2302 and 2304, feed counter 122 and cutter counter 124. When feed counter 122 counts down from its predetermined set point and reaches zero and activates panel feeder clutch mechanism 1100, as explained earlier, feed counter 122 also resets cutter counter 124 to zero. Counter 124 counts down from its predetermined set point to zero. For example, in one embodiment in which letter size folders are being produced by the machine, the predetermined set point of cutter counter 124 is 200. The number 200 corresponds to 20 inches of travel of the leading edge of the board pair as they wait to be fed into section 2000 to the point where the leading edge of the board pair is at the time the tape is to be cut. The instant the board pairs begin to be fed into section 2000, cutter counter 124 is reset by feed counter 122 and begins to count down from its predetermined set point which in this example is 200. The count-down cutter counter 124 is effected by sensor 2300 sending an electrical signal to cutter counter 124 every time a tooth, 2310, in gear 2302 passes the face of sensor 2300. Cutter counter 124, however, does not start its count down from its predetermined set point to zero until clutch mechanism 1100 is activated by feed counter 122, and at that point feed counter 122 resets cutter counter 124 which then begins its count down from its predetermined set point to zero. Since tape suction feed wheel 2024 runs at line speed, an inch of travel of board pairs also corresponds to an inch of tape feed.

Feed counter 122 sets the board spacing by setting the counter to a predetermined set point. For example if file folders are produced by the machine the predetermined set point is 250 for letter size folders and 310 for legal size folders. Counter 122 counts down from its set point to zero whereupon it fires or activates board pushers 1004, resets itself to zero and resets cutter counter. This procedure automatically adjusts board spacing to amount or length of tape fed.

Knife counter 124 picks up the same signal as feed counter 122 but knife counter 124 starts counting down from its predetermined set point. For example for file folders the predetermined set point for counter 124 is approximately 190 for letters and approximately 210 for legal. Cutter counter 124 starts counting down from its set point only after feed counter reaches zero. The predetermined set points are different because of the physical location of parts in the machine plus the inertia of starting parts moving.

Figure 21:
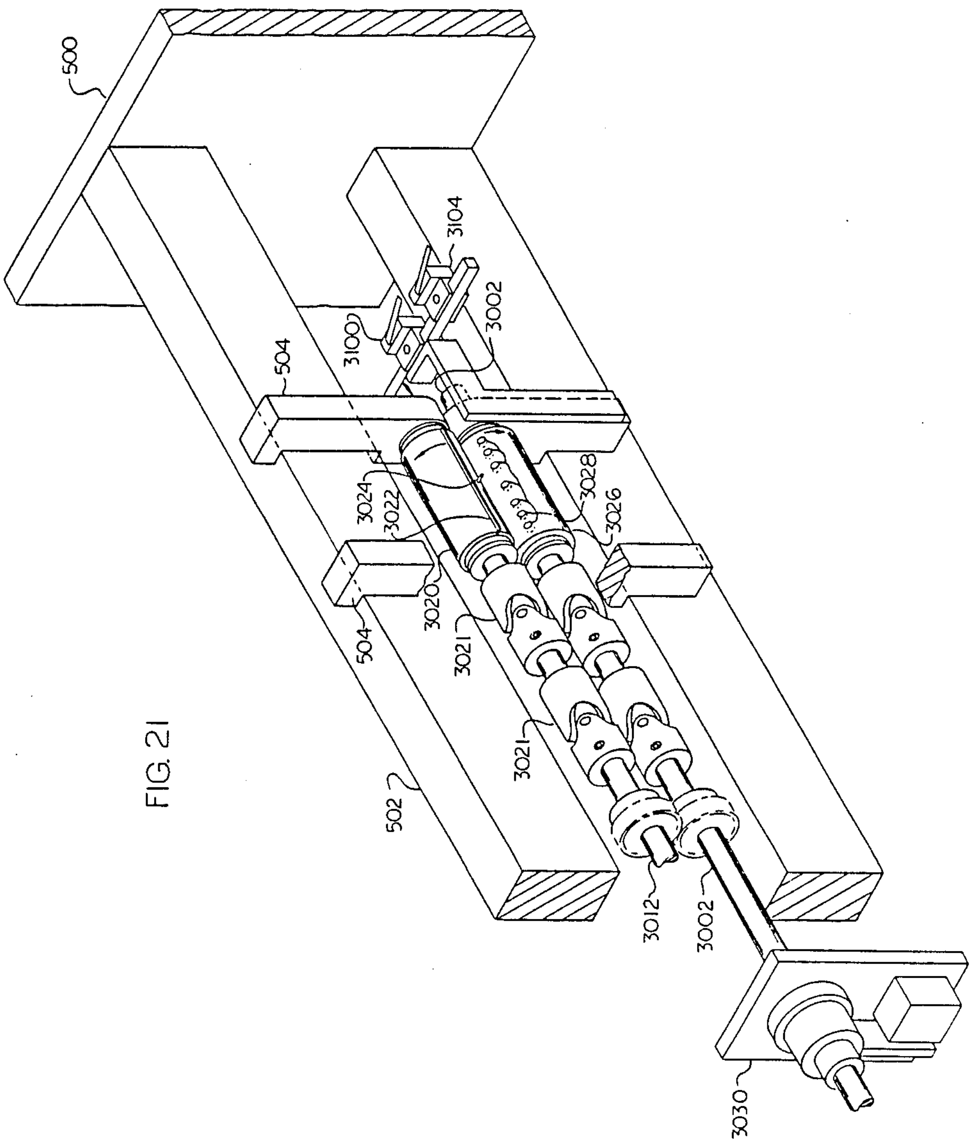
FIG. 21 is a perspective view of the die rule cutting cyclinder 3020, its opposing roller and support structure therefor.

With this system of automatic control, the tape cutting is always registered to the panel spacing, however, it is even more important as a control feature for the operator since the system can always be reset and the tape cut at the discretion of the operator in order to minimize waste at start-up, shut-down or in case of an inadvertent jam in the line to clear the line. Although the counter receives the same input signal, as will be explained, each counter is independent of the other. When cutter counter 124 reaches its predetermined set point and is reset it sends an electrical signal to cutter clutch mechanism 3030 which activates mechanism 3030 thereby causing shaft 3012 and cutting cylinder 3020 to make one complete revolution thereby cutting the tape a predetermined distance downstream of the advancing board pair. In an alternative embodiment, feed counter 122 and knife counter 124 can be replaced with an encoder or system of limit switches and timers. The tape is cut by die rule 3022 mounted on cutting cylinder 3020 which is shown in FIG. 21. After the tape is cut a tape leader is formed for the board pair advancing towards cutting cylinder 3020 and a tape trailer is formed for the board pair immediately downstream of cutting cylinder 3020. As the board pair continues to advance at line speed the tape leader attached thereto is picked up by picker pins 3024 mounted on cylinder 3020 as shown in FIG. 21 and schematically in FIGS. 7 and 8. Die rule 3022 on cylinder 3020 makes a "kiss impression" on lower anvil roller 3026 which is rigidly fixed to shaft 3002. A "kiss impression" is operable to completely sever tape 200 across its width without actually touching or damaging anvil roller 3026.

Cutting cylinder 3020 comprises die rule 3022 and picker pin or pins 3024 as shown in FIG. 21. Die rule 3022 is a strip of die rule which fits in a groove in cylinder 3020 and is held in the groove by screws or bolts which are countersunk into and below the cylindrical surface of cylinder 3022. As such die rule 3022 can be easily removed from cylinder 3020 when necessary and replaced with a new die rule. Picker pin or pins 3024 protrude from the cylindrical surface of cyclinder 3022 and are located just slightly behind the die rule so that immediately after cutting the tape, the tape is snagged or hooked by the picker pin or pins as the cutting cylinder continues to rotate in the direction of the arrow shown thereon. Opposing anvil roller 3026 to cylinder 3020 contains a series of recesses 3028 which pins 3024 rotate into and out of as rollers 3020 and 3026 rotate. Recesses 3028 are designed to prevent actual contact of pins 3024 with roller 3026. In the embodiment shown in FIG. 21 while only one pin, 3024, is shown it is to be understood that several such pins could be contained in roller 3020. It has been found, however, that when producing file folders only one centrally located pin is actually required in order to grab the tape and pull it over the leading edge of the advancing board pair. However, if heavier or stiffer tape is used more than one pin may be necessary to consistently pull the tape leader over advancing board pairs.

It is to be noted that die rule 3022 lies in the plane of the axis of cylinder 3020 and consequently tape 200 is cut at a right angle to longitudinal sides of the tape. Since die rule 3022 does not actually touch opposing anvil roller 3026, the tape is severed by a chopping action of the die rule against the tape while the tape is under tension due to the continuous advancement of the board pair in the machine. This chopping-type severance effecting the cutting of the tape is to be contrasted to a shearing-type severance in which a blade shears against another blade or surface such as in a pair of scissors or in a reel-type lawn mower in which a scroll-like blade shears against a flat planar surface. In both the scissors and reel lawn mower, the shearing action begins at one edge of the stock and progresses through the stock to the other edge of the stock. If this were used in the present machine the tape would tend to leave a jagged edge at the point of final severance due to the fact that the tape is under tension created by the advancing board pair in the machine and would tear apart at the final point of severance. In this invention the chopping-type severance is made simultaneously across the entire width of the tape thereby resulting in a clean severance at a right angle to the length of the tape. It can be appreciated that a jagged leading edge of tape also forms a jagged trailing edge which is undesirable both functionally in that it tends to snag when the folder is in use and work loose and cosmetically because it suggests poor product quality control. For these reasons it is important that the tape be severed cleanly and at a right angle to the length of the tape.

Shaft 3021, on which cutting cylinder 3020 is fixed, is provided with two universal joints 3021 to prevent a jam from occurring under cylinder 3020.

Figure 8:
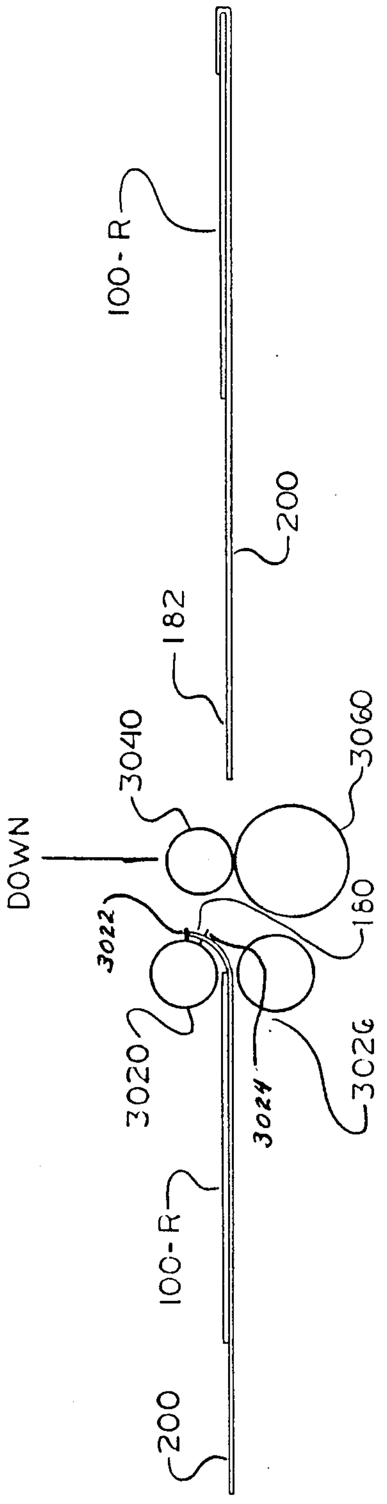

After the tape is cut and tape leader 180 and tape trailer 182 are thereby formed, tape leader 180 is picked up by pin or pins 3024 as shown in FIG. 21 and schematically in FIG. 8. As the board pair continues to advance at line speed past cutting cylinder 3020, tape leader 180 is pulled over the leading edge of the board pair. As the board pair continues to advance at line speed in horizontal plane 502, tape leader 180 is pulled free of pin or pins 3024. Leader 180, having been turned back over the leading edge and upper surface of the board pair is in an effective position for being bonded or laminated to the upper surface of the board pairs. Tape leader 180 is ironed down over the leading edge of the board pair automatically and at line speed in horizontal plane 502 as follows.

Figure 7:
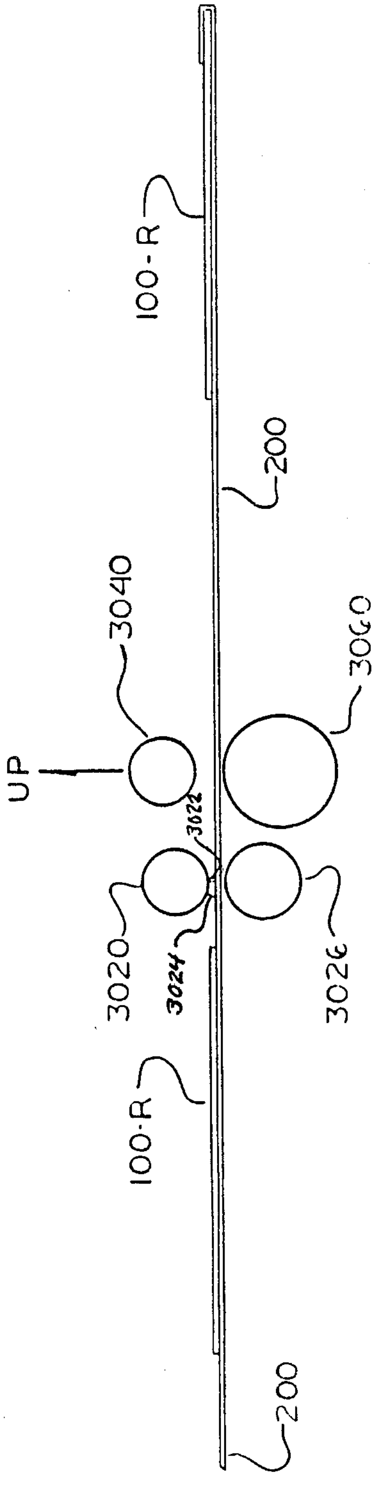
FIGS. 7 and 8 are schematic views, in side elevation, of the tape cutting operation of the machine.

Ironing roller 3040, which is normally in the up or elevated position as shown schematically in FIG. 7, is forced downward as shown schematically in FIG. 8 and FIG. 2 so that roller 3040 can roll or iron tape leader 180 over the leading edge of the board pair. This operation as well as tape cutting is all performed as the board pair advances at line speed in horizontal work plan 502 of the machine. Roller 3040 is rigidly fixed to shaft 3014 which is spin mounted to frame member 3044. Frame member 3044 is connected to double acting pneumatic cylinder 3046 which in turn is rigidly fixed to bracket 3048 which is fastened to crossmember 3050 which in turn is fixed to frame 500 as shown in FIG. 2. Just before the board pair reaches roller 3040, cylinder 3046 is displaced downward against lower roller 3060 which is driven at line speed by shaft 3004. Roller 3040 is not powered and is made to rotate merely by friction created by the board pair passing between rollers 3040 and 3060.

Cylinder 3046 is displaced downward by a system comprising limit switches 3100, three-way roll solenoid valve 3102 and second limit switch 3104. As the leading edge of board 100-L contacts switch 3100, switch 3100 sends an electrical signal to valve 3102, which is connected to cylinder 3046, to open to pressurized air source 300 as shown in FIG. 19. When pressurized air enters double acting cylinder 3046 causing it to extend and depress roller 3040 against roller 3060. As the board pair pass between rollers 3040 and 3060 the downward force exerted by cylinder 3064 on roller 3040 bonds or irons tape leader 180 to the upper surface of the board pair.

As the board pair continues advancing at line speed along horizontal work plane 502, the leading edge of board 100-L contacts second limit switch 3104 which is a short distance, about six inches, downstream of switch 3100. Switch 3100 sends an electrical signal to valve 3102 to close the first air passageway to cylinder 3046 and to open a second air passageway to cylinder 3046 which causes it to retract thereby raising roller 3040 and displacing it away from roller 3060. Roller 3040 remains in the elevated or up position until the next board pair activates switch 3100 thereby causing the process as described above to repeat. The boards joined at their under surfaces by tape and at their upper surfaces by leader 180 are discharged at line speed in horizontal plane 502 by positive transport nips 3110 into tape wrapping section 4000. Nips 3110 are rigidly fixed to and driven by upper shaft 3016. Tape guide wheels 3112 guide tape trailer 182 through cutting section 3000 and into tape wrapping section 4000 as shown in FIG. 1.

As the board pair enters tape wrapping section 4000 it is conveyed on horizontal work plane 502 by conveyor belt 4226 which runs continuously. The board pair continues to advance until the leading edge of board 100-L trips limit switch 4300 as shown in FIG. 3. When tape wrapping limit switch 4300 is triggered it sends an electrical signal to tape wrapping clutch mechanism 4002 which cause mechanism 4002 to activate thereby impart power to clutch output shaft 4012 and causing chains 4052 to rotate. Clutch mechanism 4002 is similar to clutch mechanisms 1100 and 3030. When clutch mechanism 4002 is activated it causes output shaft 4012 to make one revolution which because of the gearing cause chains 4054 to travel one-half of a complete cycle. One-half a cycle of chains 4054 corresponds to one cycle of tape wrapping since there are two wipers 4344 fastened to chains 4054 and since chain 4054 needs to make only one half a cycle to complete one cycle of tape wrapping as can be seen from FIG. 9. Board clamp limit switch 4306 is mounted on clutch mechanism 4002 such that when switch 4306 is contacted the clamp is in one position and when it is not contacted it is in another position. Switch 4306, when contacted by the clutch during its rotation, directs clamp solenoid valve 4308 to pressurize clamp cylinders 4302 so that they extend thereby holding boards 100-L and 100-R firmly against table 4304 with sufficient downward force to prevent conveyor belt 4226 from advancing the boards along table 4304. When clutch 4002 reaches a point in its cycle that it releases switch 4306, then switch 4306 directs solenoid valve 4308 to pressurize clamp cylinders 4302 so that they retract and release the boards so that they can be advanced along table 4304 by belt 4226. This process of board clamping and release is conducted on each cycle of activation of clutch mechanism 4002.

Figure 9:
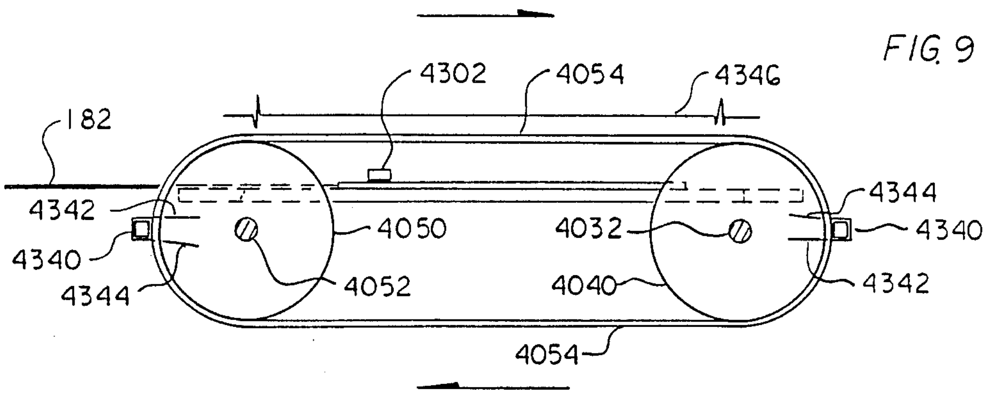
FIGS. 9, 10 and 11 are schematic views, in side elevation, of the tape wrapping and tape trailer bonding operations showing the tape wrapping cycle before it starts, just after starting and near the end of the tape wrapping cycle, respectively.
Figure 10:
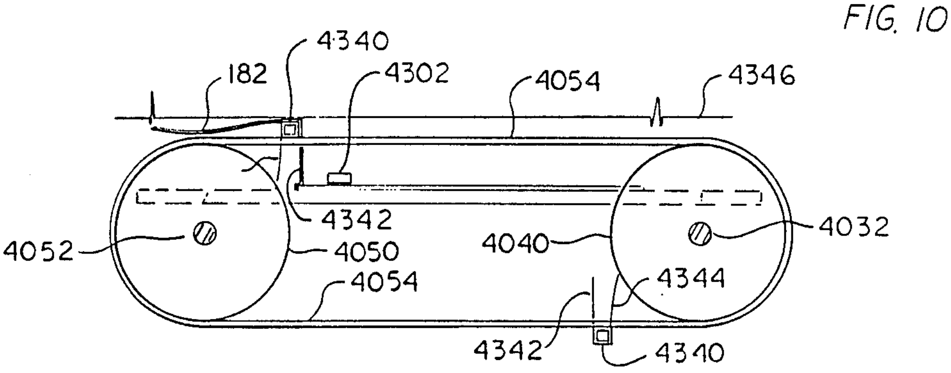
Figure 11:
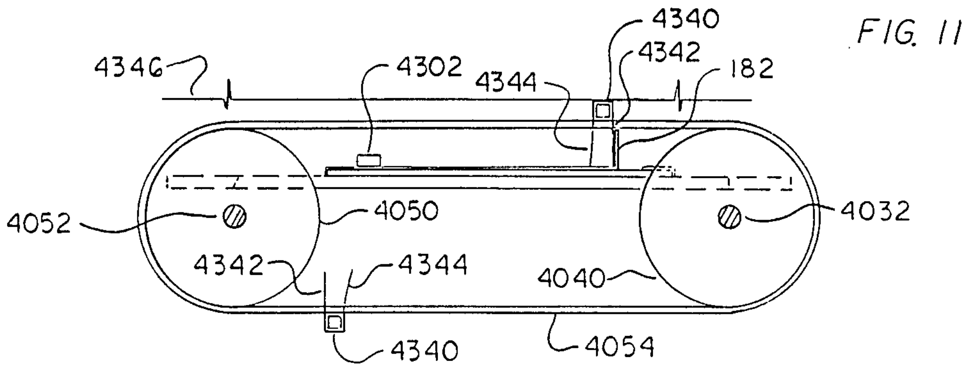

As mentioned, rigidly fastened to chains 4052, are two tape turning bars, bars 4340 as shown in detail in FIG. 3 and schematically in FIGS. 9, 10 and 11. Supported on each bar 4340, are a tape guide 4342 and a tape wiper 4344. Just before limit switch 4300 is tripped by board 100-L, bars 4340 and chains 4054, are motionless and rest in the position shown schematically in FIG. 9 with tape trailer 180 stretched out behind or upstream of the board pair. When limit switch 4300 is triggered chains 4054 rotate in the clock direction in FIGS. 9 to 11. Tape guide 4342 engages the tape and guides it over the center of the upper surface of the board pair as shown schematically in FIG. 10. Tape 4344 then wipes the tape down on to the upper surface of the board pair. As bar 4340 nears the end of its cycle as shown schematically in FIG. 11 most of tape trailer 182 has been wrapped over and down onto the board pair. During the wrapping operation clamps 4302 prevent the board pair from moving. To provide tension on tape trailer 182 as it is being wrapped over the upper surface of the board pair tape trailer 182 is held against the upper edge of guide 4342, bar 4340 and wiper 4344 by tension wire 4346. After clutch mechanism 4002 completes one cycle, tape trailer has been wrapped over and down on to the board pair and overlaps the tape leader as shown in FIG. 18C so that only one edge of the cut edge of the tape is exposed. It can be seen that the board pair has been completely wrapped with one single piece of tape. After the tape trailer is wrapped over the board pair, clamps 4302 are automatically deactivated and conveyor belt 4226 automatically advances the board pair into blocking section 5000.

FIG. 3 is a perspective of the tape trailer wrapping operation with tape trailer 182 part way through the wrapping operation. Clamp 4302, which holds board 100-R against table 4304, is fastened under cantilever 4400. Cantilever 4400 is relatively massive to insure that it does not bend when clamp 4302 is activated. Clamp 4302 which holds board 100-L against table 4304 is fastened to cantilevered bar 4402 which is fastened to spacer 4404 which in turn is fastened to table 4304. Cantilevered bar 4406 which is fastened to spacer 4408 which in turn is fastened to table 4304 rigidly supports retainer bracket 4410 which restrains roller weights 4412. Bracket 4410 is also supported by bar 4402. Weights 4412 rest on top of board 100-L when a board is at that location or upon conveyor belt 4226 when no board is present at that location. Weights 4412 are separated from each other by a thin dividing member which runs across the sides of bracket 4410. Bracket 4410 acts as a cage individually for each weight. Weights 4412 fit loosely in the bracket and are free to roll therein as board 100-L is conveyed along table 4304 or as they rest on top of conveyor belt 4226. Bracket 4410 is slightly skewed so as to urge board 100-L against adjustable side guard 4414. The skewness of the roller weights in combination with guard 4414 maintains the board pairs in proper position as the board pairs are conveyed through tape wrapping section 4000. Tension wire 4346 is held taut by compression spring 4416 which is fastened to brace 4418 which is fastened to cross beam 4420. The other end of wire 4346 is fastened to brace 4422 which is fastened to cross beam 4424. Beams 4420 and 4424 are fastened to frame 500. Table 4304 is split into two pieces to permit conveyor belt 4226 to engage the under surface of board 100-L. The upper surface of table 4304 and of belt 4226 lie in horizontal work plan 502 of the machine. Table 4304 contains notches 4426 to permit guide 4342 and wiper 4344 to pass through during the tape wrapping operation. By having guides 4342 and wipers 4344 inside the loop of chain 4054 and by having tape trailer 180 and the board pair also inside the loop of chain 4054 reliable wrapping of the tape around the board pair is achieved.

After taping is completed, conveyor belt 4226 advances the board pairs into blocking section 5000 whereupon the board pairs are blocked over mandrel 5080. FIG. 13 shows the board pair in cross section as seen in the direction of lines A—A, B—B and C—C of FIG. 1. As shown in FIGS. 1 and 2, board 100-R is turned up, over and down so that it overlies board 100-L. Board 100-L remains in horizontal work plane 502 while board 100-R is being turned. The board pair is first blocked over mandrel 5080, in section 5000, then creased by plates 6100 in section 6000, and then pressed in section 7000 by boning nips 7100 and 7102. The gusset is formed without the need to score the tape thereby improving the strength of the gusset compared to gussets which have been scored. Scoring weakens the gusset and tends to provide a tear line in the gusset material. This invention has the advantage of not requiring scoring to form the unitary bonded board structure.

Figure 12:
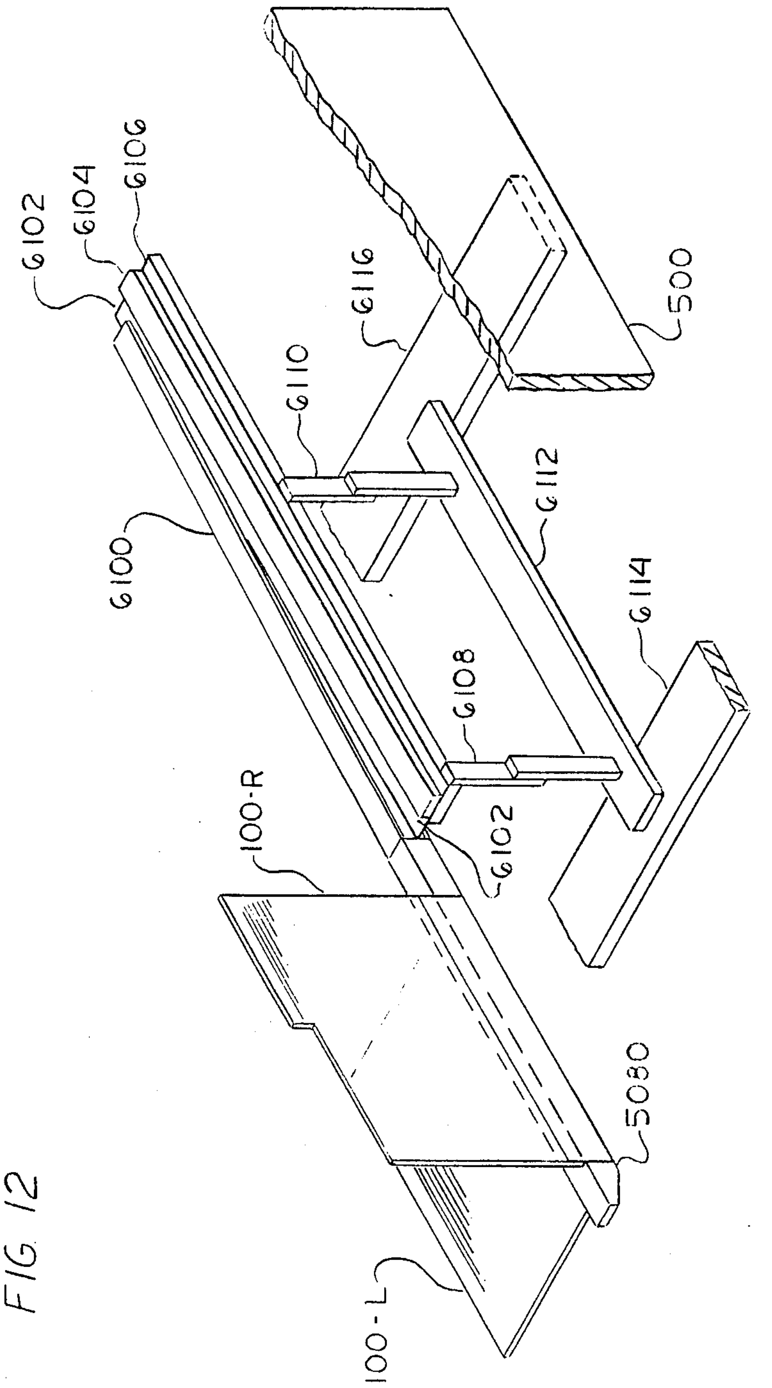
FIG. 12 is a schematic view of the blocking and creasing or gusset operation.

In sections 5000, 6000, and 7000 board 100-L is driven at line speed, i.e., the same speed as in laminating section 2000, in horizontal work plane 502 of the machine by transport wheels on both sides of the board. In sections 5000 and 6000 the bonded board structure is blocked over mandrel 5080 and then the tape is creased, without scoring of the tape, with female plates 6100 and male plate 6102 as shown schematically in FIG. 12. As shown in FIG. 12 male blade 6102 is secured between clamp plate 6104 and base plate 6106. Base plate 6104 is supported by vertical members 6108 and 6110 which are supported by horizontal member 6112 which is fastened to horizontal cross members 6114 and 6116. Members 6114 and 6116 are fastened at their ends to frame 500 on both sides of the machine. FIG. 1B shows the location of members 6108, 6110, 6112, 6114 and 6116 in section 6000. Small table 5110 is for supporting the bonded board structure as it is being blocked. Restraining bar 5112 urges the board structure against mandrel 5080. For each lower transport wheel there is a corresponding upper transport wheel whose axis is in the same vertical plane as the axis of its corresponding lower transport wheel as shown in FIG. 1.

The axis of upper shaft 5200 lies in the vertical plane of the axis of lower shaft 4202. Shaft 5200 runs across the machine. Fastened to shaft 5200 is ironing roller 5202 and transport wheel 5100 as shown in FIG. 1. An opposite ironing roller and transport wheel are fastened to shaft 4202. As the board pair enter blocking section 5000 the tape which has been wrapped around the board pair is pressed or ironed tight down against both the upper and lower surfaces of the board pair by roller 5202 and its opposing roller on shaft 4202. Wheel 5100 and its opposing wheel on shaft 4202 grab board 100-L and drive it into section 5000 against adjustable side constraining bar 5204. Shortly thereafter the fore or tab corner of board 100-R encounters folding bar 5206 which causes board 100-R as it advances through section 5000 to be lifted up and over blocking mandrel 5080 until board 100-R has been completely blocked over mandrel 5080 as shown in FIG. 13A.

After board 100-L is driven by wheel 5100 the board encounters transport wheels 5108 on cantilevered upper shaft 5208. Two opposing transport wheels are fastened to lower shaft 522. Wheels 5108 and their opposing wheels on shaft 522 drive board 100-L further into section 5000 and against blocking mandrel 5080 and thense under transport wheels 5210 fastened to cantilevered upper shaft 5212. Wheels 5210 drive board 100-L further on to bar 5206 and mandrel 5080 and into transport wheels 5214 on cantilevered upper shaft 5216. Wheels 5214 and their opposing wheels on lower shaft 5062 drive the board still further onto bar 5206 and mandrel 5080. The process is repeated by transport wheels 5218, 5220, 5222, 5224, 5226, and 5228 which are fastened to cantilevered upper shafts.

Blocking mandrel 5080 shrinks in height and width as the board pair advances into creasing section 6000 as shown in FIGS. 11, 13A and 13B. Female creasing plates 6100 form a part of mandrel 5080 at the upstream part of the mandrel as shown in FIG. 13A. By the time the board pair reaches line B—B in FIG. 1 female plates 6100 have been moved closer together and male creasing plate 6102 moved traversely into the space between the boards as shown in FIG. 13B. Finally by the time the board pair reaches line C—C in FIG. 1 the mandrel has ended and male plate 6102 is inserted into the full creasing depth between the boards so as to completely crease the tape therebetween as shown in FIG. 13C. Neither female plates 6100 nor male plate 6102 has a sharp edge which is operable for scoring the tape thereby preventing any score lines from appearing on the tape.

Figure 14:
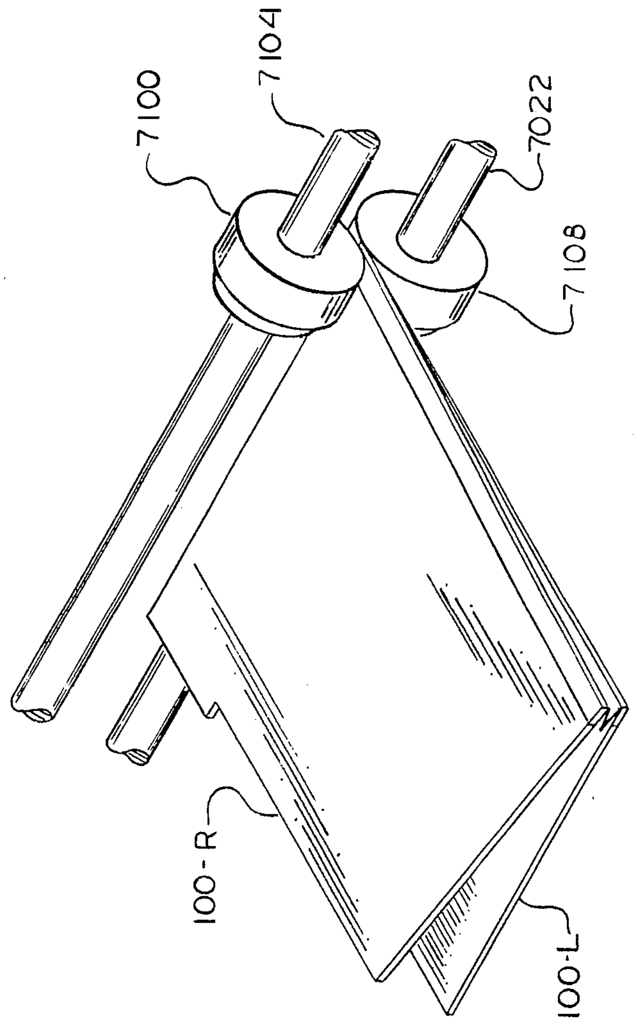
FIG. 14 is a schematic view of the final pressing or bonding operation performed on an unitary bonded board structure.

The transport wheels on upper shafts 5234, 5236, 5238 and 5240 are made smaller in diameter to allow the board pairs to move closer together. Since the transport wheels are smaller in diameter their shafts are geared to a higher speed so that the wheels will run at line speed. This is accomplished by sprockets 6200 and 6202 and chains 6204 and 6206 as shown in FIGS. 1 and 23. From creasing section 6000 transport wheels 5228 drive the board pair into pressing section 7000 wherein pressing or boning nips 7100 and 7102 upper shafts 7104 and 7106 respectively press the gusset previously formed in the creasing section as shown schematically in FIG. 14. Nips 7100 and 7102 are fastened to upper shafts 7104 and 7106 respectively. Lower shafts 7022 and 7008 contain nips which oppose nips 7100 and 7102. Shaft 7104 also contains a transport wheel 7108 which drives the board pair into pressing nip 7102. In one embodiment of this invention as the taped-joined board pair travel through blocking section 5000, creasing section 6000 and pressing section 7000, panel board 100-R, which is folded over panel board 100-L, is pulled through the machine by the tape which joins board 100-L to machine driven board 100-R. As the line speed of the machine is increased panel board 100-R tends to lag behind driven panel board 100-L in sections 5000, 6000 and 7000. This can result in causing a wrinkle in the tape gusset of the final folder product and/or a slight off-set in registry of panel boards. To allow relatively high line speeds to be used while maintaining registry of panel board 100-R to its corresponding panel board 100-L, a speed assist mechanism to correct any lagging of panel board 100-R behind panel board 100-L is included in one embodiment of this invention. The details of the speed assist mechanism are shown as seen in FIGS. 27 and 28. FIGS. 1B and 2B shows the location of the speed assist mechanism in sections 6000 and 7000. Sword element 7178 and other minor elements of the speed assist mechanism shown in detail in FIGS. 27 and 28 have been omitted from FIGS. 1B and 2B to more clearly show other details of the machine.

Referring to FIGS. 27, 28, 1B and 2B, the speed assist mechanism comprises fixed pulley wheel 7120 which is attached to the operator side of upper shaft 7104 of the machine. Upper shaft 7104 of the machine drives pulley belt 7122, which drives variable pulley wheel 7124 attached to upper shaft 7106. Tension pulley wheel 7126 is forced against belt 7122 by manually turning of knob 7128. As wheel 7126 is displaced further into belt 7122, the belt expands variable pulley wheel 7124 thereby increasing the rotational speed of shaft 7106. As seen in FIG. 27, turning of knob 7128 causes externally-threaded linkage member 7130 to be screwed into or out of internally-threaded linkage member 7132. Linkage member 7132 is pivotly hinged by pin 7134 to linkage member 7136 which is also pivotally hinged to shaft 7106. Tension pulley wheel 7126 is rotatably mounted to member 7136 by pin 7138. Linkage member 7130 is rotatably supported in a bearing in structural member 7140 which is rigidly mounted to the operator side of frame 500.

Towards the center of shaft 7104 there is fixed first pulley 7152 of speed assist subassembly 7150 shown in FIG. 28. Subassembly 7150 comprises second pulley 7154 and third pulley 7156 which constrains pulley belt 7158. Parallel and opposing support members 7160 and 7162 contain bearings (not shown) on one end thereof which engage shaft 7104. Pulley wheel 7154 is rotatably mounted on pin 7164 located on the other end of and between support members 7160 and 7162. Members 7160 and 7162 are attached to structural members 7166, 7168 and 7170. Member 7168 is attached to frame 500. Third pulley wheel 7156 is rotatably mounted on pin 7172 which is attached to opposing members 7174 which are attached to parallel support members 7160 and 7162. To avoid undue complication to FIG. 28, only one of opposing members 7174 is shown; however, it is easily understood that pin 7172 is supported on the far side by a member similar to depicted member 7174. Spacer block 7176 serves to maintain the desired separation of parallel members 7160 and 7162. Cantilevered sword member 7178 is mounted to support members 7180 and 7182 which are attached to frame 500 of the machine. Sword 7178 is closely aligned with a part of pulley belt 7158 that lies between first pulley 7152 and third pulley 7156. Belt 7158 contains an outer surface, 7184, which is a high friction surface operable for pulling board panels at relatively high speed between belt 7158 and sword 7178.

In operation knob 7128 is turned until the rotational speed of shaft 7106 and consequently the rotational speed of belt 7158 is operable for just overcoming any slight lag which otherwise may exist in panel board 100-R relative to panel board 100-L. Although this is a trial and error procedure, the correct speed of belt 7158 can be quickly obtained to effect registry of board 100-R to board 100-L. In actual practice only a few folders need to be run through the machine to adjust the speed assist mechanism to proper belt speed. Belt 7158 travels in the direction of the arrows shown thereon while panel board 100-R travels along the top surface of sword 7178 in the direction of the arrow shown thereon.

In another embodiment of this invention (not shown in the figures) an alternative speed assist mechanism is used which comprises a closed loop servo system.

From section 7000 the board pairs are dropped into batch assembly table 8002 which comprises conveyor belt 8004. Fastened to the end of frame 500 is kicker mechanism 7200 which kicks the last board pair in a predetermined batch size causing the board pair to fall onto conveyor belt 8004 at a skewed angle thereby indicating to the operator that a batch of a predetermined number of board pairs has been produced. Mechanism 7200 is controlled by predetermined batch signal counter 126 mounted on control console 120. Counter 126 is preset for a predetermined batch size of board pairs as folders. Limit switch 7202 sends an electrical signal to counter 126 every time a completed board pair triggers limit switch 7202. When counter 126 reaches its predetermined set point or batch size counter 126 sends an electrical signal to batch pneumatic valve 7204, which is normally closed, to open which allows pressurized air to extend an air cylinder in mechanism 7200 which in turn causes the board pair or folder to be kicked so that it falls in a skewed position on conveyor belt 8004. The air cylinder in the mechanism is a single acting spring action, air cylinder which after being extended vents itself and returns to its retracted position. Counter 126 after reaching its predetermined count resets itself to zero and begins to count again as more folders or board pairs are produced. Upon resetting itself counter 126 allows batch pneumatic valve to close.

The electrical schematic for the system is shown in FIG. 19. Control console 120 comprises predetermined feed signal counter 122, predetermined cutter signal counter 124, predetermined batch signal counter 126, power "ON" button 128, vacuum to tape suction feed wheel "ON" button 130, feed counter and cutter counter reset button 132, line speed control potentiometer 134, line run/start button 136, line stop button 138, glue pot agitator on/off toggle switch 140 and run toggle switch 142. The function and purpose of counters 122, 124 and 126 have been described earlier. Power button 128 turns power on to the control circuit of the machine. Vacuum button 130 turns off the vacuum to suction feed wheel 2024 by closing vacuum solenoid valve 2080. Reset button 130 when pushed activates or fires board feeder clutch mechanism 1100 and tape cutter clutch mechanism 3030 and resets counters 122 and 124. Line speed control potentiometer 134 varies the speed of main motor 510 by varying the D.C. voltage to motor 510 through voltage controller 420. A nonlimiting example of a voltage controller operable for this purpose is VEH series Ratiotrol 1-3HP brand controller by Boston Gear. To start the machine run button 136 is pushed. The machine will then keep on running until stop button 138 is pushed as long as toggle switch 142 is in the "run" position. If switch 142 is in the "jog" position the machine will run only as long as run/start button 136 is depressed. As soon as button 136 is released the machine will stop if switch 142 is in the "jog" position. "ON/OFF" agitator motor toggle switch 140 turns auxiliary motor 550 on and off.

Power is supplied to the system through junction box 400. Thermostat 402 is used to control the temperature of the glue in glue pot 2030 by means of electrical strip heaters 404 attached to base 2031 of glue pot 2030. Electrical logic module 406 transmits signals from batch counter limit switch 7202 over conduit 1, tape turner limit switch 4300 over conduit 2, ironing roller limit switch 3100 to lower roller over conduit 3, ironing roller limit switch 3104 to raised roller over conduit 4, cutter signal counter 124 over conduit 5, feed clutch limit switch 1200 over conduit 6, and board clamp limit switch 4306 over conduit 7, and thense to the various clutches, cylinders and solenoid valves as described earlier. Conduits 1 to 7 are only shown exiting electric module 406 of FIG. 19. It is to be understood, however, that conduits 1 to 7 connect with the various beforementioned limit switches and cutter signal counter 124. Pneumatic logic module 408 transmits pressurized air from solenoid valves upon command from logic module 406 to the vacuum generator and the several air cylinders described above. Compressed air is supplied to the system by compressed air source 300.

With the exception of the circuit board in electrical module 406, all components used are standard products. The circuit board in module 406 is reproducible based on the information given below.

A. Junction box 400 is fed with 208–220 volt single phase power and 115 volt single phase power. The 208–220 volt lines go directly to a 3 horsepower solid state D.C. voltage controller 420. From here 90 volt D.C. power is supplied to 3 horsepower D.C. main motor 510. Low voltage control wires pass from voltage controller 420, through junction box 400 and electrical module 406 to control buttons 134, 136, 138 and 142 on operator control panel 120. D.C. voltage controller 420 is energized by toggle switch 422 located in the face of voltage controller 420.

B. 115 volt power passes through junction box 400 to thermostat 402 which controls the power to strip heaters 404 which in turn controls the temperature of glue pot 2030 when hot glue is used for tape bonding.

C. 115 volt power from junction box 400 supplies power to agitator motor 550 after passing through on/-off switch 140 on operator control panel 120.

D. 115 volt power passes from junction box 400 to electrical module 406. Module 406 houses the circuit board and wiring terminal strips for the various electrical control functions and air logic module 408.

E. Compressed air from plant compressed air source 300 is regulated to approximately 60 psi prior to entering all mufflered solenoid valves in air logic module 408.

The following functions are performed by these subsystems:

1. Single revolution feed clutch mechanism 1100 is energized when predetermined feed signal counter 122 is satisfied.

2. Venturi type vacuum generator 2042, FIG. 16, is activated and supplies vacuum to tape 200 when button 130 on operator control panel 120 is depressed by opening vacuum solenoid valve 2080 thereby allowing compressed air to enter generator 2042 and produce a partial vacuum by venturi action.

3. Single revolution cutter clutch mechanism 3030 is energized when predetermined cutter signal counter 124 is satisfied.

4. Ironing roll (down) limit switch 3100 activates 3-way solenoid valve 3102 thereby forcing ironing roller 3040 downward.

5. Ironing roll (up) limit switch 3104 activates 3-way solenoid valve 3102 thereby raising ironing roller 3040 upward.

6. Limit switch 4300 attached to clutch mechanism 4002 energizes solenoid valve 4308 which in turn activates panel board clamps 4302. After the clutch of tape wrapping clutch mechanism 4002 has made one revolution, limit switch 4306 thereon, deenergizes solenoid valve 4308 thereby opening clamps 4302.

7. Limit switch 4300 also energizes wrapping clutch mechanism 4002 through a one shot power pack therein when switch 4300 is triggered by a board pair entering section 4000.

8. Product file folders from section 7000 trigger batch counter limit switch 7202 which signals batch signal counter 126 on control panel 120. When counter 126 is satisfied, i.e. reaches its predetermined count, it energizes batch solenoid valve 7204 which activates kicker mechanism 7200.

9. Depression of reset button 136 on operator control panel 120 fires all clutch mechanisms, i.e. mechanisms 1100, 3030, and 4002, and resets all predetermined signal counters, i.e. counters 122, 124 and 126, thereby bring all processing subsystem functions in proper synchronization when restarting the line at the operator's command.

Figure 15:
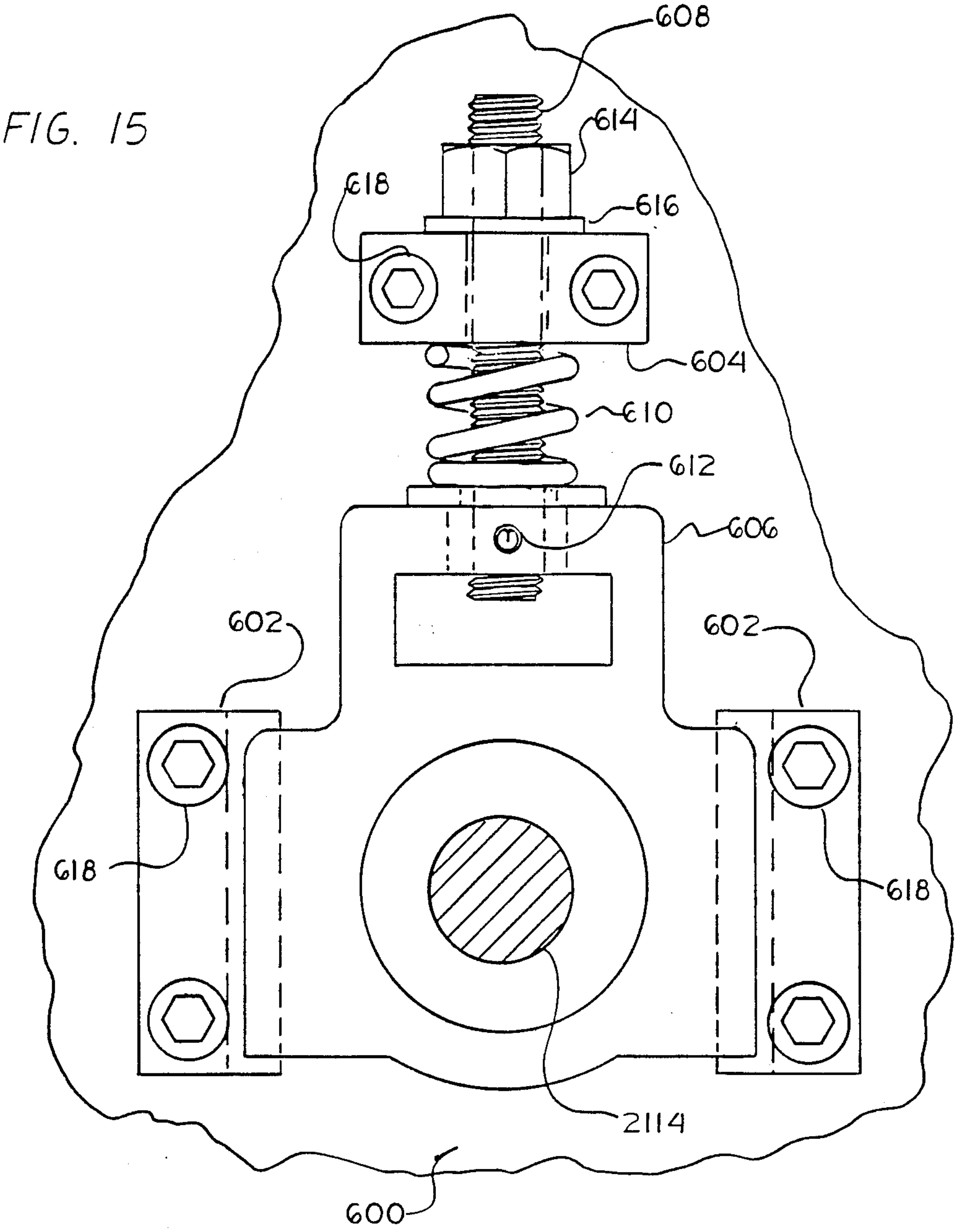
FIG. 15 is a side elevation view of a mechanism for adjusting the height of a shaft relative to the frame of the machine for purposes of adjusting the space between upper and lower rollers.

FIG. 15 shows shaft height adjustment mechanism 600 for raising and lowering upper shafts in the machine relative to frame 500 of the machine. Mechanism 600 is shown on upper shaft 2114 in FIG. 2. It should be understood that mechanism 600 is on each upper shaft which acts as a roller or nip which oppose a roller or nip or a corresponding lower shaft. For shafts running across the machine mechanism 600 is attached to the outside of frame 500 and on both sides of the machine. For cantilevered shafts, mechanism 600 is attached to main frame 500 and outboard frame 540. Mechanism 600 comprises frame mounts 602 and 604 which are bolted to frame 500, slideable shaft bearing 606, elevation screw 608, compression spring 610, screw lock screw 612, adjusting nut 614 and washer 616. Mounts 602 and 604 are shown fastened to frame 500 with six Allen head bolts 618. Screw 612 locks screw 608 and fixes the height of bearing 606 and the shaft supported thereby. Nut 614 is used to adjust the height of shaft 2114 or any other upper shaft relative to frame 500 or 540. Compression spring 610 prevents bearing 606 from raising above its adjusted position except in the case of an unusual interference, for example a jam. Since lower shafts are not height adjustable relative to frame 500, adjusting the height of upper shafts relative to the frame adjust the space between upper and lower shafts and rollers, wheels, and nips thereon.

Although it is usually preferable to have the line in sections 1000, 2000, 3000, 5000, 6000 and 7000 run at the same speed, it is to be understood that different speeds can be used. For example, sections 5000, 6000, and 7000 can run at a higher speed than sections 1000, 2000, and 3000. Sections 6000 and 7000 can run at a higher speed than section 6000. Similarly, section 7000 can run at a higher speed than section 6000. Other variations in speeds between the sections can be used if desired for a particular reason.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in the figures and that variations in such minor details will be apparent to one skilled in the art.

What is claimed is:

1. A machine for automatically forming unitary bonded board structures from pairs of boards and a tape source comprising:

conveying means for automatically advancing board pairs placed thereon, approximately along a first plane in a straight line first direction such that, when said machine is in use, (i) at least one set of corresponding traverse edges of a board pair while being automatically advanced by said conveying means, lie approximately along a traverse edge straight line perpendicular to said first direction, and (ii) the first board of such board pair is automatically spaced apart from the second board of such board pair in a direction perpendicular to said first direction a predetermined traverse separation distance thereby forming and maintaining a traverse gap between such first and second boards as such boards are automatically advanced approximately along said first plane in said first direction by said conveying means;

tape feeding means for automatically feeding, when said machine is in use, a tape from a tape source, proximate the under surface of such board pair and proximate said traverse gap such that the vertical projection of such thusly fed tape spans such traverse gap and overlies the first board of such board pair a first predetermined traverse overlap distance traversely spaced from the longitudinal edge of the first board which forms such traverse gap and overlies the second board of such board pair a second predetermined traverse overlap distance traversely spaced from the longitudinal edge of the second board which forms such traverse gap;

first bonding means for automatically bonding, when said machine is in use, such tape to the under surface of the first and second boards of such board pair over said first and second predetermined traverse overlap distances respectively as such board pair is automatically advanced by said conveying means approximately along said first plane in said first direction;

tape cutting means for automatically cutting, when said machine is in use, such tape at a predetermined lead distance from the leading edge of such board pair as such board pair is automatically advanced by said conveying means approximately along said first plane in said first direction thereby forming a tape leader for such board pair immediately upstream of said tape cutting means, and also simultaneously forming a tape trailer for the preceding board pair immediately downstream of said tape cutting means;

second bonding means for automatically bonding, when said machine is in use, such tape leader to the upper surface of the first and second boards of such board pair to which such tape leader is attached, over said first and second predetermined traverse overlay distances respectively thereby covering a portion of the leading edge of such board pair, and also for automatically bonding such tape leader to a portion of such tape which spans such traverse gap from the under surface of such board pair, as the leading edge of such board pair is automatically advanced by said conveying means approximately along said first plane in said first direction away from said cutting means; and third bonding means for automatically bonding, when said machine is is use, such tape trailer to the upper surface of the first and second boards of such board pair to which such tape trailer is attached approximately over said first and second predetermined traverse overlay distances respectively thereby covering a portion of the trailing edge of such boards, and for automatically bonding such tape trailer to a portion of such tape which spans such traverse gap from the under surface of such board pair longitudinally from the trailing edge thereof, thereby forming an unitary bonded board structure as such board pair is approximately in said first plane of said conveying means.

2. The machine of claim 1, further comprising:

controlling means for automatically controlling said conveying means, said tape feeding means, said first bonding means, said tape cutting means, said second bonding means, and said third bonding means.

3. The machine of claim 1, wherein said tape cutting means comprises:

a die rule mounted longitudinally on a rotating cutting cylinder, and a corresponding and opposing rotating anvil roller spaced a distance from said die rule that is operative for effecting a kiss impression by said die rule on said anvil roller.

4. The machine of claim 3, wherein said anvil roller is rigidly fixed to a rotating shaft, and wherein said cutting cylinder is fixed to a shaft containing universal joints operative for permitting said distance between said die rule and said anvil roller to be automatically increased when a jam occurs between said cutting cylinder and said anvil roller.

5. A machine for automatically forming a gusset in unitary bonded board structures which comprise a first and second board bounded together traversely by a tape overlay such that the first board is separated from the second board by a traverse gap which is spanned by such tape comprising:

conveying means for automatically advancing, when said machine is in use, an unitary bonded board structure approximately along a first plane in a straight line first direction;

blocking means comprising a blocking mandrel for automatically blocking, when said machine is in use, such unitary bonded board structure over said blocking mandrel, said blocking mandrel having approximately parallel upper and lower surfaces and a vertical face, by automatically elevating and rotating about 180 degrees the second board relative to the first board of such unitary bonded board structure such that the vertical projection of such second board overlies the first board of such unitary bonded board structure, and such that the portion of tape between the first and second boards of such unitary bonded board structure lies in a vertical plane perpendicular to said first plane, and abuts said vertical face of said blocking mandrel while said second board abuts the upper surface of said blocking mandrel and said first board abuts the lower surface of said blocking mandrel, as such first board is automatically advanced approximately along said first plane in said first direction by said conveying means; and creasing means for automatically forming, when said machine is in use, at least one crease in the portion of tape between the boards of such unitary bonded board structure as the first board thereof is automatically advanced approximately along said first plane in said first direction, said creasing means being downstream of said blocking means, thereby forming a gusset in such unitary bonded board structure.

6. The machine of claim 5 further comprising a speed assist mechanism means for increasing the speed of said second board of said unitary bonded board structure relative to said first board of said board structure, said speed assist mechanism means being located in said machine after said blocking means and before said creasing means.

7. A machine for automatically forming unitary bonded board structures from pairs of boards and a single continuous piece of tape from a tape source comprising:

conveying means for automatically advancing board pairs placed thereon, approximately along a first plane in a straight line first direction such that, when said machine is in use, (i) at least one set of corresponding traverse edges of a board pair while being automatically advanced by said conveying means, lie approximately along a traverse edge straight line perpendicular to said first direction, (ii) the first board of such board pair is automatically spaced apart from the second board of such board pair in a direction perpendicular to said first direction a predetermined traverse separation distance thereby forming and maintaining a traverse gap between such first and second boards as such boards are automatically advanced approximately along said first plan in said first direction by said conveying means;

tape feeding means for automatically feeding when said machine is in use, a tape from a tape source, proximate the under surface of such board pair and proximate said traverse gap such that the vertical projection of such thusly fed tape spans such traverse gap and overlies the first board of such board pair a first predetermined traverse overlap distance traversely spaced from the longitudinal edge of the first board which forms such traverse gap and overlies the second board of such board pair a second predetermined traverse overlap distance traversely spaced from the longitudinal edge of the second board which forms such traverse gap;

first bonding means for automatically bonding, when said machine is in use, such tape under tension to the under surface of the first and second boards of such board pair over said first and second predetermined traverse overlap distances respectively as such board pair is automatically advanced by said conveying means approximately along said first plane in said first direction;

tape cutting means for automatically cutting, when said machine is in use, such tape at a predetermined lead distance from the leading edge of such board pair as such board pair is automatically advanced by said conveying means approximately along said first plane in said first direction thereby forming a tape leader for such board pair immediately upstream of said tape cutting means, and also simultaneously forming a tape trailer for the preceding board pair immediately downstream of said tape cutting means;

holding means for automatically holding, when said machine is in use, such tape leader under tension for a predetermined length of time while such board pair to which such tape leader is attached is automatically advanced by said conveying means approximately along said first plane in said first direction away from said cutting means, said holding means also for automatically pulling such tape under tension over the leading edge of such board pair while such board pair is automatically advanced approximately along said first plane in said first direction away from said cutting means;

second bonding means for automatically bonding, when said machine is in use, such tape leader under tension to the upper surface of the first and second boards of such board pair to which such tape leader is attached, over said first and second predetermined traverse overlay distances respectively thereby covering a portion of the leading edge of such board pair, and also for automatically bonding such tape leader to a portion of such tape which spans such traverse gap from the under surface of such board pair, as the leading edge of such board pair is automatically advanced by said conveying means approximately along said first plane in said first direction away from said cutting means;

tape wrapping means for automatically pulling, when said machine is in use, such tape trailer under tension over the trailing edge of such board pair to which such tape trailer is attached and over the upper surface of the first and second boards of such board pairs approximately over said first and second predetermined traverse overlay distances respectively; and third bonding means for automatically bonding, when said machine is in use, such tape trailer under tension to the upper surface of the first and second boards of such board pair to which such tape trailer is attached approximately over said first and second predetermined traverse overlay distances respectively thereby covering a portion of the trailing edge of such boards, and for automatically bonding such tape trailer to a portion of such tape which spans such traverse gap from the under surface of such board pair longitudinally from the trailing edge thereof, thereby forming an unitary bonded board structure as such board pair is approximately in said first plane of said conveying means.

8. The machine of claim 7, further comprising:

controlling means for automatically controlling said conveying means, said tape feeding means, said first bonding means, said tape cutting means, said holding means, said second bonding means, said tape wrapping means, and said third bonding means.

9. A machine for automatically forming unitary bonded board structures from pairs of boards and a single continuous piece of tape from a tape source comprising:

board feeding means for automatically and sequentially placing at predetermined time intervals pairs of boards of approximately equal length along edges thereof to be joined by tape, from a source of such boards, in a predetermined orientation on a conveying means;

said conveying means for automatically advancing board pairs placed thereon by said board feeding means, approximately along a first plane in a straight line first direction such that, when said machine is in use, (i) at least one set of corresponding traverse edges of a board pair while being automatically advanced by said conveying means, lie approximately along a traverse edge straight line perpendicular to said first direction, (ii) the first board of such board pair is automatically spaced apart from the second board of such board pair in a direction perpendicular to said first direction a predetermined traverse separation distance thereby forming and maintaining a traverse gap between such first and second boards as such boards are automatically advanced approximately along said first plane in said first direction by said conveying means, and (iii) board pairs are automatically spaced apart in a direction parallel to said first direction a predetermined longitudinal separation distance thereby forming and maintaining a longitudinal gap between sequential board pairs as such board pairs are automatically advanced approximately along said first plane in said first direction;

tape feeding means for automatically feeding, when said machine is in use, a tape from a tape source, proximate the under surface of such board pair and proximate said traverse gap such that the vertical projection of such thusly fed tape spans such traverse gap and overlies the first board of such board pair a first predetermined traverse overlap distance traversely spaced from the longitudinal edge of the first board which forms such traverse gap and also overlies the second board of such board pair a second predetermined traverse overlap distance traversely spaced from the longitudinal edge of the second board which forms such traverse gap;

first bonding means for automatically bonding, when said machine is in use, such tape under tension to the under surface of the first and second boards of such board pair over said first and second predetermined traverse overlap distances respectively as such board pair is automatically advanced by said conveying means approximately along said first plane in said first direction;

tape cutting means for automatically cutting, when said machine is in use, such tape at a predetermined lead distance from the leading edge of such board pair as such board pair is automatically advanced by said conveying means approximately along said first plane in said first direction thereby forming a tape leader for such board pair immediately upstream of said tape cutting means, and also simultaneously forming a tape trailer for the preceding board pair immediately downstream of said tape cutting means;

holding means for automatically holding, when said machine is in use, such tape leader under tension for a predetermined length of time while such board pair to which such tape leader is attached is automatically advanced by said conveying means approximately along said first plane in said first direction away from said cutting means, said holding means also for automatically pulling such tape leader under tension over the leading edge of such board pair while such board pair is automatically advanced approximately along said first plane in said first direction away from said cutting means;

second bonding means for automatically bonding, when said machine is in use, such tape leader under tension to the upper surface of the first and second boards of such board pair to which such tape leader is attached, over said first and second predetermined traverse overlay distances respectively thereby covering a portion of the leading edge of such board pair, and also for automatically bonding such tape leader to a portion of such tape which spans such traverse gap from the under surface of such board pair, as the leading edge of such board pair is automatically advanced by said conveying means approximately along said first plane in said first direction away from said cutting means;

tape wrapping means for automatically pulling, when said machine is in use, such tape trailer under tension over the trailing edge of such board pair to which such tape trailer is attached and over the upper surface of the first and second boards of such board pairs approximately over said first and second predetermined traverse overlay distances respectively;

third bonding means for automatically bonding, when said machine is in use, such tape trailer under tension to the upper surface of the first and second boards of such board pair to which such tape trailer is attached approximately over said first and second predetermined traverse overlay distances respectively thereby covering a portion of the trailing edge of such boards, and for automatically bonding such tape trailer to a portion of such tape which spans such traverse gap from the under surface of such board pair longitudinally from the trailing edge thereof, thereby forming an unitary bonded board structure as such board pair is approximately in said first plane of said conveying means.

10. The machine of claim 9, further comprising:

controlling means for automatically controlling said board feeding means, said conveying means, said tape feeding means, said first bonding means, said tape cutting means, said holding means, said second bonding means, said tape wrapping means, and said third bonding means.

11. A machine for automatically forming unitary bonded board structures from pairs of boards and a single continuous piece of tape from a tape source comprising:

board feeding means for automatically and sequentially placing at predetermined time intervals pairs of boards of approximately equal length along edges thereof to be joined by tape, from a source of such boards, in a predetermined orientation on a conveying means;

said conveying means for automatically advancing board pairs placed thereon by said board feeding means, approximately along a first plane in a straight line first direction such that, when said machine is in use, (i) at least one set of corresponding traverse edges of a board pair while being automatically advanced by said conveying means, lie approximately along a traverse edge straight line perpendicular to said first direction, (ii) the first board of such board pair is automatically spaced apart from the second board of such board pair in a direction perpendicular to said first direction a predetermined traverse separation distance thereby forming and maintaining a traverse gap between such first and second boards as such boards are automatically advanced approximately along said first plane in said first direction by said conveying means, and (iii) board pairs are automatically spaced apart in a direction parallel to said first direction a predetermined longitudinal separation distance thereby forming and maintaining a longitudinal gap between sequential board pairs as such board pairs are automatically advanced approximately along said first plane in said first direction;

tape feeding means, separate from said board feeding means, for automatically feeding, when said machine is in use, a tape from a tape source, proximate the under surface of such board pair and proximate said traverse gap such that the vertical projection of such thusly fed tape spans such traverse gap and overlies the first board of such board pair a first predetermined traverse overlap distance traversely spaced from the longitudinal edge of the first board which forms such traverse gap and also overlies the second board of such board pair a second predetermined traverse overlap distance traversely spaced from the longitudinal edge of the second board which forms such traverse gap;

first bonding means for automatically bonding, when said machine is in use, such tape under tension to the under surface of the first and second boards of such board pair over said first and second predetermined traverse overlap distances respectively as such board pair is automatically advanced by said conveying means approximately along said first plane in said first direction;

tape cutting means for automatically cutting, when said machine is in use, such tape at a predetermined lead distance from the leading edge of such board pair as such board pair is automatically advanced by said conveying means approximately along said first plane in said first direction thereby forming a tape leader for such board pair immediately upstream of said tape cutting means, and also simultaneously forming a tape trailer for the preceding board pair immediately downstream of said tape cutting means;

holding means for automatically holding, when said machine is in use, such tape leader under tension for a predetermined length of time while such board pair to which such tape leader is attached is automatically advanced by said conveying means approximately along said first plane in said first direction away from said cutting means, said holding means also for automatically pulling such tape under tension over the leading edge of such board pair while such board pair is automatically advanced approximately along said first plane in said first direction away from said cutting means;

second bonding means for automatically bonding, when said machine is in use, such tape leader under tension to the upper surface of the first and second boards of such board pair to which such tape leader is attached, over said first and second predetermined traverse overlay distances respectively thereby covering a portion of the leading edge of such board pair, and also for automatically bonding such tape leader to a portion of such tape which spans such traverse gap from the under surface of such board pair, as the leading edge of such board pair is automatically advanced by said conveying means approximately along said first plane in said first direction away from said cutting means;

tape wrapping means for automatically pulling, when said machine is in use, such tape trailer under tension over the trailing edge of such board pair to which such tape trailer is attached and over the upper surface of the first and second boards of such board pairs approximately over said first and second predetermined traverse overlay distances respectively;

third bonding means for automatically bonding, when said machine is in use, such tape trailer under tension to the upper surface of the first and second boards of such board pair to which such tape trailer is attached approximately over said first and second predetermined traverse overlay distances respectively thereby covering a portion of the trailing edge of such boards, and for automatically bonding such tape trailer to a portion of such tape which spans such traverse gap from the under surface of such board pair longitudinally from the trailing edge thereof, thereby forming an unitary bonded board structure as such board pair is approximately in said first plane of said conveying means;

blocking means for automatically blocking, when said machine is in use, such unitary bonded board structure over a blocking mandrel by automatically elevating and rotating about 180 degrees the second board relative to the first board of such unitary bonded board structure such that the vertical projection of such second board overlies the first board of such unitary bonded board structure, and such that the portion of tape between the first and second boards of such unitary bonded board structure lies in a vertical plane perpendicular to said first plane, as such first board is automatically advanced approximately along said first plane in said first direction by said conveying means; and creasing means for automatically forming, when said machine is in use, at least one crease in the portion of tape between the boards of such unitary bonded board structure as the first board thereof is automatically advanced approximately along said first plane in said first direction, said creasing means being downstream of said blocking means, thereby forming a gusset in such unitary bonded board structure.

12. The machine of claim 11, further comprising:

controlling means for automatically controlling said board feeding means, said conveying means, said tape feeding means, said first bonding means, said tape cutting means, said holding means, said second bonding means, said tape wrapping means, said third bonding means, said blocking means, and said creasing means such that, when said machine is in use, a plurality of such board pairs are simultaneously conveyed and operated upon by said machine.

13. The machine of claim 11, further comprising:

pressing means for automatically pressing, when said machine is in use, the gusset in such unitary bonded board structure as the first board thereof is automatically advanced approximately along said first plane in said first direction, said pressing means being downstream of said creasing means, thereby forming a pressed gusset in such unitary bonded board structure.

14. The machine of claim 13, further comprising:

controlling means for automatically controlling said board feeding means, said conveying means, said tape feeding means, said first bonding means, said tape cutting means, said holding means, said second bonding means, said tape wrapping means, said third bonding means, said blocking means, said creasing means and said pressing means such that, when said machine is in use, a plurality of such board pairs are simultaneously conveyed and operated upon by said machine.

15. A machine for automatically forming unitary bonded board structures from a pair of boards spaced apart a predetermined distance thereby forming a traverse gap between said boards of said pair and taped together on the under surface thereof with a single piece of tape which has a tape leader which extends beyond the leading edge of the board pairs and a tape trailer which extends beyond the trailing edge of the board pair comprising:

holding means for automatically holding, when said machine is in use, such tape leader under tension for a predetermined length of time while such board pair to which such tape leader is attached is automatically advanced by a conveying means approximately along a first plane in a first direction, said holding means also for automatically pulling such tape under tension over the leading edge of such board pair while such board pair is automatically advanced approximately along said first plane in said first direction;

leader bonding means for automatically bonding, when said machine is in use, such tape leader under tension to the upper surface of such board pair to which such tape leader is attached thereby covering a portion of the leading edge of such board pair, and also for automatically bonding such tape leader to a portion of such tape which spans such traverse gap from the under surface of such board pair, as the leading edge of such board pair is automatically advanced by said conveying means approximately along said first plane in said first direction;

tape wrapping means for automatically pulling, when said machine is in use, such tape trailer under tension over the trailing edge of such board pair to which such tape trailer is attached and over the upper surface of the first and second boards of such board pairs approximately over said first and second predetermined traverse overlay distances respectively; and trailer bonding means for automatically bonding, when said machine is in use, such tape trailer under tension to the upper surface of the first and second boards of such board pair to which such tape trailer is attached thereby covering a portion of the trailing edge of such boards, and for automatically bonding such tape trailer to a portion of such tape which spans such traverse gap from the under surface of such board pair longitudinally from the trailing edge thereof, thereby forming an unitary bonded board structure as such board pair is approximately in said first plane, of said conveying means.

16. The machine of claim 15, further comprising:

controlling means for automatically controlling said conveying means, said holding means, said leader bonding means, said tape wrapping means, and said trailer bonding means.

17. The machine of claim 15 further comprising:

second conveying means for automatically conveying, when said machine is in use, said unitary bonded board structure away from said tape wrapping means approximately along said first plane in said first direction.

18. The machine of claim 17, further comprising:

controlling means for automatically controlling said first mentioned conveying means, said holding means, said leader bonding means, said tape wrapping means, said trailer bonding means and second conveying means.

19. The machine of claim 15, wherein said tape wrapping means comprises:

clamping means for automatically clamping said board pair to the upper surface of a horizontal wrapping table, said upper surface lying approximately in said first plane;

guiding means, which travels around said horizontal wrapping table, for automatically guiding and pulling said tape trailer over the trailing edge of such board pair and over said traverse gap while said board pair is clamped to said upper surface of said horizontal wrapping table by said clamping means; and wiping means, which also travels around said horizontal wrapping table, for automatically wiping said tape trailer, after it has been guided and pulled over the upper surface of such board pair by said guiding means, down onto the upper surface of said board pair and over said traverse gap.

20. A method for continuously forming unitary bonded board structures from a source of boards and a single continuous piece of tape from a tape source comprising:

(a) continuously feeding tape from a single continuous source of tape at a predetermined speed along a horizontal plane;

(b) continuously feeding board pairs at a predetermined cycle and in a predetermined orientation at said predetermined speed approximately along said horizontal plane;

(c) automatically bonding said tape to the under surface of said board pair while said tape and said board pair is being continuously conveyed at said predetermined speed approximately along said horizontal plane;

(d) after bonding said tape to the under surface of said board pair in step (c), automatically cutting said tape at a predetermined distance from the leading edge of the board pair while said board pair is being continuously conveyed at said predetermined speed approximately along said horizontal plane thereby forming a tape leader for one board pair and a tape trailer for the board pair fed along said horizontal plane in the cycle immediately preceding said former mentioned board pair;

(e) automatically pulling said tape leader over the leading edge of the board pair to which said tape leader is attached while said board pair is being continuously conveyed at said predetermined speed approximately along said horizontal plane;

(f) automatically bonding said tape leader pulled over the leading edge of said board pair in step (e) to the upper surface of said board pair while said board pair is being continuously conveyed at said predetermined speed approximately along said horizontal plane;

(g) after bonding said tape leader to the upper surface of said board pair, automatically stopping the conveying of said board pair and rigidly holding said board pair in a fixed position approximately in said horizontal plane for a predetermined length of time;

(h) during said predetermined length of time mentioned in step (g), automatically pulling the tape trailer attached to said board pair rigidly held in said fixed position over the trailing edge of said board pair;

(i) after pulling said tape trailer over the trailing edge of said board pair in step (h) and during said predetermined length of time while said board pair is being held in said fixed position, automatically bonding said tape trailer to the upper surface of said board pair thereby forming an unitary bonded board structure;

(j) after said predetermined length of time mentioned in step (g), automatically conveying said unitary bonded board structure formed in step (i) from said fixed position; and (k) repeating steps (b) through (j) of said method thereby continuously forming unitary bonded board structures.

21. The method of claim 20, further comprising:

(l) automatically blocking said unitary bonded board structure conveyed from said fixed position in step (j) while said board structure is being continuously conveyed at a second predetermined speed and while one of said boards of said structure remains approximately in said horizontal plane;

(m) automatically creasing said board structure blocked in step (l) while said board structure is being continuously conveyed at said second predetermined speed approximately and while one of said boards of said structure remains approximately in said horizontal plane thereby forming a gusset in said board structure; and (n) repeating steps (l) and (m) of said method thereby continuously forming unitary bonded board structures with gussets.

22. The method of claim 21, further comprising:

(o) automatically pressing said board structure creased in step (m) while said board structure is being continuously conveyed at said second predetermined speed and while one of said boards of said structure remains approximately in said horizontal plane thereby forming a pressed gusset in said board structure; and (p) repeating step (o) of said method thereby continuously forming unitary bonded board structures with pressed gussets.

23. The method of claim 22, wherein said predetermined speed mentioned in step (a) and said second predetermined speed mentioned in step (l) are equal.

24. A method for continuously forming unitary bonded board structures from a source of boards and a single continuous piece of tape from a tape source comprising:

(a) continuously feeding tape from a single continuous source of tape at a predetermined speed along a horizontal plane into a first section;

(b) continuously feeding board pairs at a predetermined cycle and in a predetermined orientation at said predetermined speed approximately along said horizontal plane into said first section;

(c) automatically bonding said tape to the under surface of said board pair while said tape and said board pair is being continuously conveyed at said predetermined speed approximately along said horizontal plane in said first section;

(d) after bonding said tape to the under surface of said board pair in step (c), conveying said board pair at said predetermined speed approximately along said horizontal plane into a second section and automatically cutting said tape at a predetermined distance from the leading edge of the board pair while said board pair is being continuously conveyed at said predetermined speed approximately along said horizontal plane in said second section thereby forming a tape leader for one board pair and a tape trailer for the board pair fed along said horizontal plane in the cycle immediately preceding said former mentioned board pair;

(e) automatically pulling said tape leader over the leading edge of the board pair to which said tape leader is attached while said board pair is being continuously conveyed at said predetermined speed approximately along said horizontal plane in said second section;

(f) automatically bonding said tape leader pulled over the leading edge of said board pair in step (e) to the upper surface of said board pair while said board pair is being continuously conveyed at said predetermined speed approximately along said horizontal plane in said second section;

(g) after bonding said tape leader to the upper surface of said board pair, conveying said board pair at said predetermined speed approximately along said horizontal plane into a third section;

(h) automatically stopping the conveying of said board pair and rigidly holding said board pair in a fixed position approximately in said horizontal plane for a predetermined length of time in said third section;

(i) during said predetermined length of time mentioned in step (h), automatically pulling the tape trailer attached to said board pair rigidly held in said fixed position in said third section over the trailing edge of said board pair;

(j) after pulling said tape trailer over the trailing edge of said board pair in step (i) and during said predetermined length of time while said board pair is being held in said fixed position in said third section, automatically bonding said tape trailer to the upper surface of said board pair thereby forming an unitary bonded board structure;

(k) after said predetermined length of time mentioned in step (h), automatically conveying said unitary bonded board structure formed in step (j) from said fixed position in said third section into a fourth section approximately in said horizontal plane; and (l) repeating steps (b) through (k) of said method thereby continuously forming unitary bonded board structures.

25. The machine of claim 4, wherein said tape cutting means comprises:

a die rule mounted longitudinally on a rotating cutting cylinder, and a corresponding and opposing rotating anvil roller spaced a distance from said die rule that is operative for effecting a kiss impression by said die rule on said anvil roller.

26. The machine of claim 25, wherein said anvil roller is rigidly fixed to a rotating shaft, and wherein said cutting cylinder is fixed to a shaft containing universal joints operative for permitting said distance between said die rule and said anvil roller to be automatically increased when a jam occurs between said cutting cylinder and said anvil roller.

* * * * *